United States Patent
Ito et al.

(10) Patent No.: US 11,254,313 B2
(45) Date of Patent: Feb. 22, 2022

(54) TRAVELLING CONTROL APPARATUS

(71) Applicant: DENSO CORPORATION, Kariya (JP)

(72) Inventors: Yutaro Ito, Kariya (JP); Hiroyuki Nanjo, Kariya (JP)

(73) Assignee: DENSO CORPORATION, Kariya (JP)

( * ) Notice: Subject to any disclaimer, the term of this patent is extended or adjusted under 35 U.S.C. 154(b) by 235 days.

(21) Appl. No.: 16/429,364

(22) Filed: Jun. 3, 2019

(65) Prior Publication Data
US 2019/0367032 A1 Dec. 5, 2019

(30) Foreign Application Priority Data
Jun. 1, 2018 (JP) .............................. JP2018-105933

(51) Int. Cl.
*B60W 30/18* (2012.01)
*B60W 50/00* (2006.01)

(52) U.S. Cl.
CPC ...... *B60W 30/18072* (2013.01); *B60W 50/00* (2013.01); *B60W 2520/10* (2013.01); *B60W 2554/801* (2020.02); *B60W 2554/804* (2020.02); *B60W 2555/60* (2020.02)

(58) Field of Classification Search
CPC ........... B60W 30/18072; B60W 50/00; B60W 2554/804; B60W 2555/60; B60W 2554/801; B60W 2520/10
See application file for complete search history.

(56) References Cited

U.S. PATENT DOCUMENTS

| 10,311,749 | B1 * | 6/2019 | Kypri | G06Q 40/00 |
| 2014/0046581 | A1 * | 2/2014 | Ota | G08G 1/096775 701/408 |
| 2014/0067225 | A1 * | 3/2014 | Lee | B60W 30/188 701/93 |
| 2014/0156171 | A1 * | 6/2014 | Kono | B60W 10/02 701/103 |
| 2015/0088349 | A1 * | 3/2015 | Akashi | B60W 10/08 701/22 |
| 2015/0165905 | A1 * | 6/2015 | Filev | B60K 31/00 701/94 |

(Continued)

FOREIGN PATENT DOCUMENTS

JP 4998172 B2 8/2012

*Primary Examiner* — Jelani A Smith
*Assistant Examiner* — Frank T Glenn, III
(74) *Attorney, Agent, or Firm* — Oliff PLC

(57) ABSTRACT

A travelling control apparatus includes a preceding vehicle information acquiring unit acquiring a preceding vehicle travelling speed pattern indicating a travelling speed change of a preceding vehicle; an energy efficiency index calculation unit calculating an energy efficiency index indicating a degree of improvement in an energy efficiency of the vehicle, in the case where the vehicle travels based on an own vehicle travelling speed pattern indicating a travelling speed change of the vehicle when the vehicle travels tracking the preceding vehicle; a compatibility index calculation unit calculating a compatibility index indicating a degree of compatibility between the vehicle and a following vehicle based on a travelling speed of the vehicle and the following vehicle; and a control unit performing a coasting travel determination determining whether to perform a coasting travel of the vehicle based on a degree of the energy efficiency index and the compatibility index.

12 Claims, 17 Drawing Sheets

(56) References Cited

U.S. PATENT DOCUMENTS

| | | | | |
|---|---|---|---|---|
| 2015/0183433 A1* | 7/2015 | Suzuki | ................ | B60W 10/08 |
| | | | | 701/96 |
| 2015/0321673 A1* | 11/2015 | Telborn | ................ | F02D 29/02 |
| | | | | 477/33 |
| 2017/0355369 A1* | 12/2017 | La | ...................... | B60W 30/16 |
| 2018/0001764 A1* | 1/2018 | Bang | .................... | B60W 30/16 |
| 2018/0029599 A1* | 2/2018 | Kim | .................... | B60W 50/14 |
| 2018/0225975 A1* | 8/2018 | Park | .................... | G08G 1/052 |
| 2018/0273039 A1* | 9/2018 | You | ........................ | B60L 7/18 |
| 2019/0232962 A1* | 8/2019 | Broll | .............. | B60W 30/18109 |
| 2019/0277206 A1* | 9/2019 | McCarthy, Jr. | ........ | F02D 29/02 |

* cited by examiner

FIG.14 SECOND EMBODIMENT

FIG.17 FOURTH EMBODIMENT

FIG.19 FIFTH EMBODIMENT

FIG.20 FIFTH EMBODIMENT

TRAVELLING CONTROL APPARATUS

CROSS-REFERENCE TO RELATED APPLICATION

This application is based on and claims the benefit of priority from earlier Japanese Patent Application No. 2018-105933 filed Jun. 1, 2018, the description of which is incorporated herein by reference.

BACKGROUND

Technical Field

The present disclosure relates to a travelling control apparatus that controls travelling of a vehicle.

Description of the Related Art

Conventionally, as a driving assist control, an adaptive cruise control (i.e. ACC) has been achieved. The ACC controls the own vehicle to travel at a preset travelling speed while maintaining the intervehicle distance between a preceding vehicle and an own vehicle to be constant.

SUMMARY

The present disclosure is achieved with the following manner.

According to the present disclosure, a travelling control apparatus which controls travelling of a vehicle is provided. The travelling control apparatus includes a preceding vehicle information acquiring unit that acquires a preceding vehicle travelling speed pattern; an energy efficiency index calculation unit that acquires an own vehicle travelling speed pattern; a compatibility index calculation unit that calculates a compatibility index indicating a degree of compatibility between the vehicle and a following vehicle travelling behind the vehicle; and a control unit that performs a coasting travel determination determining whether to perform a coasting travel of the vehicle.

DETAILED DESCRIPTION OF THE PREFERRED EMBODIMENTS

First Embodiment

Figure 1:
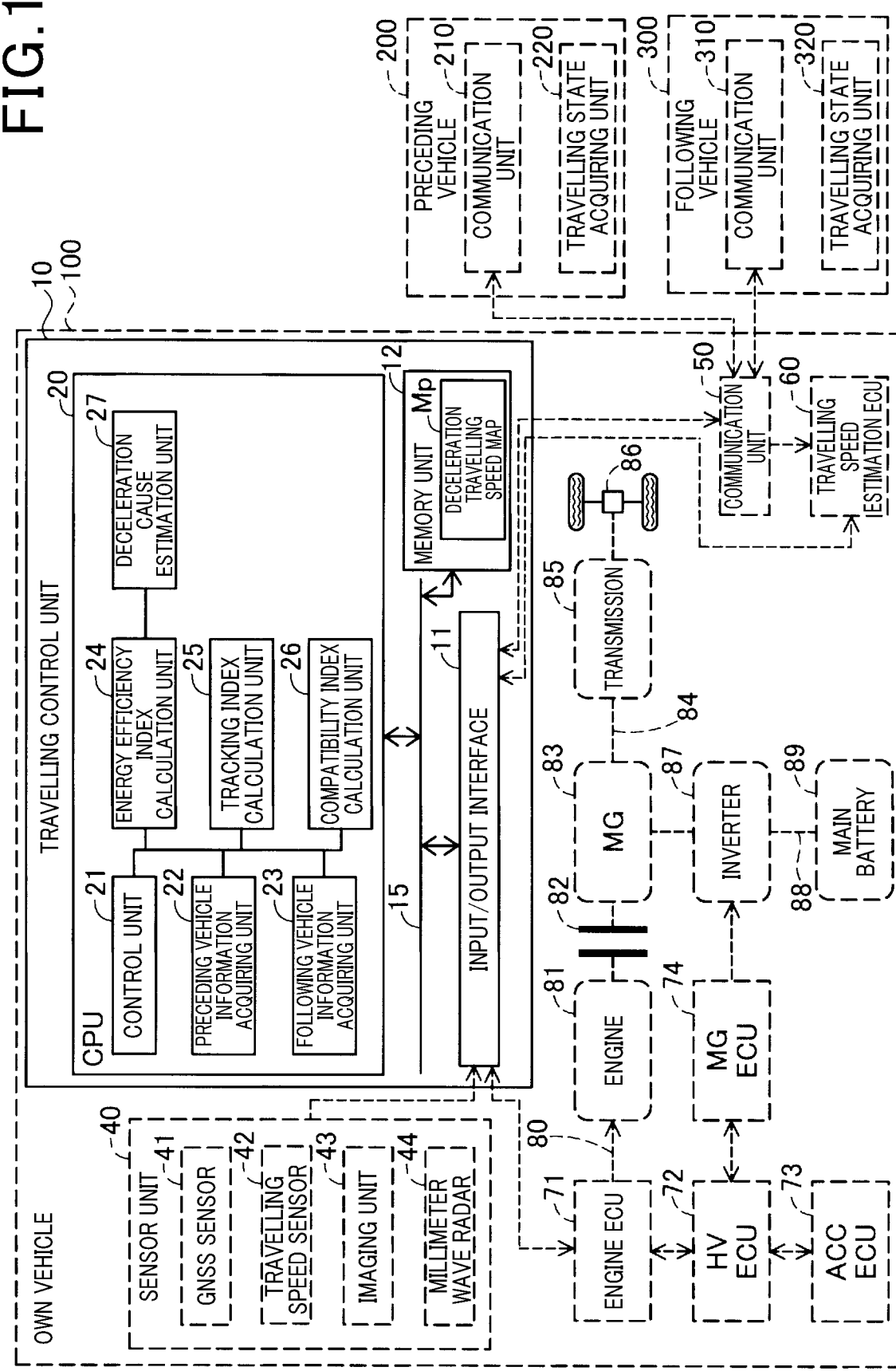
FIG. 1 is a block diagram showing an overall configuration of a travelling control apparatus according to an embodiment of the present disclosure.

A travelling control apparatus 10 shown in FIG. 1 is mounted on a vehicle 100 and controls traveling of the vehicle 100. According to the first embodiment, the vehicle 100 provided with the travelling control apparatus 10 is also referred to as "own vehicle 100". For the own vehicle 100, automatic driving can be performed. In the automatic driving operation, an engine control and a steering control are executed instead of by the driver. The travelling control unit 10 executes an engine control or a brake control to make the own vehicle 100 travel such that the travelling speed of own vehicle 100 becomes a predetermined speed set in the own vehicle 100 or a tracking speed to track the preceding vehicle. Note that the own vehicle 100 may be configured to be capable of switching between an automatic driving mode and a manual driving mode.

The own vehicle 100 is a hybrid vehicle provided with an engine 81 and a motor generator (hereinafter referred to as "MG") 83 as a power source. The power of the output shaft of the engine 81 is transmitted to a transmission 85 via the MG 83. The power of the output shaft of the transmission is transmitted to an output shaft 86. The rotary shaft of the MG 83 is coupled to a portion of a mechanical connection shaft 84 that transmits the power from the engine 81 to the transmission 85.

The MG 83 is driven by an inverter 87. The inverter 87 is connected to a main battery 89 via a electric connection wiring 88. The MG 83 receives/transmits power from/to the main battery 89 via the inverter 87. The MG 83 converts electric power supplied by the main battery 89 to motive power and outputs the converted power to the mechanical connection shaft 84. Also, the MG 83 converts the motive power transmitted from the mechanical connection shaft 84 to the electric power, thereby charging the main battery 89. The transmission 85 changes the speed of the motive force (rotational force) transmitted from the mechanical connection shaft 84. A clutch 82 transmits torque between the engine 81 and the mechanical connection shaft 84.

The engine ECU 71 transmits a signal to the engine 81 via a signal wiring 80, thereby controlling an operation of the engine 81. The engine ECU 71 controls various actuators which are not shown, thereby controlling an opening/closing operation of the throttle value, an ignition operation of an ignitor, and an opening/closing operation of an intake value, and the like.

The MG-ECU 74 controls the inverter 87, thereby controlling the MG 83. A HV-ECU 72 transmits/receives a control signal and a data signal between the engine ECU 71 and the MG-ECU 74. Then, the HV-ECU 72 controls, based on the control signal and the data signal, the engine 81 and the MG 83 depending on a driving state of the own vehicle 100.

The ACC-ECU 73 communicates with the HV-ECU 72 to execute adaptive cruise control (hereinafter referred to as ACC control) and coasting control. The ACC control maintains an intervehicle distance between the own vehicle 100 and the preceding vehicle to be constant and makes the own vehicle 100 travel at a predetermined travelling speed. The coasting control controls the own vehicle to coast-travel. The ACC-ECU 73 stops the engine 81 and cuts off the torque transmission between the engine 81 and the mechanical connection shaft 84 by using the clutch 82. The travelling speed during the coasting control decreases due to the influence of the air resistance which the own vehicle suffers. In the coasting control, as long as the engine 81 generates motive power, low efficiency driving can be avoided. As a result, the fuel efficiency of the own vehicle 100 can be improved.

The travelling control apparatus 10 is configured of an electronic control unit (i.e. ECU) including CPU 20, memory 12, and input-output interface 11. The CPU 20, the memory 12, and the input/output interface 11 are communicably connected via a bus 15 to perform bi-directional communication. The memory 12 includes ROM and RAM.

The own vehicle 100 is provided with a sensor unit 40, a communication unit 50 and a travelling speed estimation ECU 60 other than the travelling control apparatus 10.

The sensor unit 40 detects a travelling environment and a travelling state of the own vehicle 100. According to the present embodiment, the travelling environment refers to a state or condition outside the own vehicle such as a position, a relative speed, a shape or a state of the object around the own vehicle. As an object, for example, there may be another vehicle, a road marking and a road sign. The travelling state refers to a state of the own vehicle such as a travelling speed, an acceleration factor, and a rotation angular velocity.

The sensor unit 40 is provided with a GNSS sensor 41, a travelling speed sensor 42, an imaging unit 43, and a millimeter wave radar 44.

The GNSS sensor 41 detects the current location of the own vehicle 100 based on radio waves transmitted from the satellite constituting the global navigation satellite system (GNSS). The travelling speed sensor 42 detects the travelling speed of the own vehicle 100. The imaging unit 43 is disposed towards outside the own vehicle 100 and acquires at least an image ahead of the own vehicle 100. As the imaging unit 43, a single camera, a stereo camera, and a multi camera can be used.

The millimeter wave radar 44 emits millimeter waves and receives reflected waves which are reflected at an object, thereby detecting a distance between the object and the own vehicle 100, a position of the object, a size of the object, a shape of the object and a relative speed of the own vehicle relative to the object. Note that the object detected by the millimeter wave radar 44 is accurately defined as a convergence of a plurality of detection points (objects).

The sensor 40 may be provided with an acceleration sensor, a yaw rate sensor, a steering angle sensor, a laser radar (LIDAR), an ultrasonic sensor and a temperature sensor and the like, instead of or in addition to the GNSS sensor 41, the travelling speed sensor 42, the imaging unit 43, and the millimeter wave radar 44

The communication unit 50 performs wireless communication between the own vehicle 100, and the preceding vehicle 200 and the following vehicle 300, thereby acquiring information about a travelling environment and a travelling state of respective vehicles 200 and 300. The preceding vehicle 200 travels ahead of the own vehicle 100 and is provided with a communication unit 210 and a travelling situation acquiring unit 220. The communication unit 210 performs wireless communication with the communication unit 50 in the own vehicle 100. The travelling situation acquiring unit 220 utilizes a detection result of a sensor (not shown) mounted on the preceding vehicle 200 to acquire the travelling environment and the travelling state. The following vehicle 300 refers to a vehicle travelling behind the own vehicle 100 and is provided with a communication unit 310 and a travelling situation acquiring unit 320. Since the communication unit 310 and the travelling situation acquiring unit 320 have similar configurations to the communication unit 210 and the travelling situation acquiring unit 220 of the preceding vehicle 200, detailed explanation thereof will be omitted.

The communication unit 50 may acquire at least a part of information related to the above-described travelling environment and travelling state from a road-side device provided in various locations on the road using a road-vehicle communication, instead of using or in addition to the communication with the communication unit 210 of the preceding vehicle 200 and with the communication unit 310 of the following vehicle 300.

The travelling speed estimation ECU 60 estimates whether the preceding vehicle 200 decelerates or not. The travelling speed estimation ECU 60 utilizes a travelling situation of the preceding vehicle 200 and estimates whether the preceding vehicle 200 decelerates. According to the present embodiment, the travelling situation refers to a situation determined based on a situation related to a surrounding environment of the preceding vehicle 200 and the travelling situation of the preceding vehicle 200. The state of the surrounding environment corresponds to, for example, a state where the preceding vehicle is temporarily stopped, a state where the preceding 200 is about to make a right turn or a left turn at an intersection, a state where the preceding vehicle is travelling on a highway, and a state where the preceding vehicle is travelling at a low speed due to a traffic jam. A state related to a travelling state corresponds to, for example, a current location of the preceding vehicle 200, a travelling speed, and an intervehicle distance between a vehicle travelling ahead of the preceding vehicle 200 (hereinafter referred to as preceding-preceding vehicle) and the preceding vehicle 200. The travelling speed estimation ECU 60 utilizes a detection result of the sensor unit 40 and information related to the travelling environment of the preceding vehicle 200 acquired from the preceding vehicle 200 via the communication unit 50, thereby determining whether the preceding vehicle 200 decelerates or not.

Also, the travelling speed estimation ECU 60 estimates a travelling speed pattern indicating a change in the travelling speed of the preceding vehicle 200 (hereinafter referred to as preceding vehicle travelling speed pattern). The travelling speed pattern can be estimated using a known technique. For example, a current travelling speed, a target travelling speed, and a travelling distance from the current location to the target location are correlated in a predetermined formula to estimate a change in the travelling speed during a period where the preceding vehicle travels from the current location to the target location. Generally, the travelling state (behavior) of a vehicle changes in response to the travelling speed of the preceding vehicle (behavior). Hence, the travelling speed estimation ECU 60 estimates the travelling speed pattern taking the travelling speed of the preceding vehicle and the inter-vehicle distance between the own vehicle and the preceding vehicle into consideration. Note that detailed explanation of the preceding vehicle travelling speed pattern and estimation of the preceding vehicle travelling speed pattern will be described later.

The input/output interface 11 of the travelling control apparatus 10 is connected to each of the above-described sensor unit 40, the engine ECU 71, the communication unit 50 and the travelling speed estimation ECU 60 via a control signal line. The CPU 20 inputs the detection result of the sensor unit 40 and the detection result of the travelling speed estimation ECU 60 via the input-output interface 11. The engine ECU 71 inputs a drive control signal based on a command of the CPU 20 via the input-output interface 11.

The CPU 20 is provided with a preceding vehicle information acquiring unit 22, a following vehicle information acquiring unit 23, an energy efficiency index calculation unit 24, a tracking index calculation unit 25, a compatibility index calculation unit 26, a deceleration cause estimation unit 27, and a control unit 21. Each function of the preceding vehicle information acquiring unit 22, the following vehicle information acquiring unit 23, the energy efficiency index calculation unit 24, the tracking index calculation unit 25, the compatibility index calculation unit 26, the deceleration cause estimation unit 27, and the control unit 21 are accomplished by the CPU that executes a control program stored in the memory 12. The respective units 21 to 27 are configured as individual program modules, in which required processes are always executed using an interrupt process and a memory unit (not shown). Therefore, hereinafter, calculations executed by the respective units 21 to 27 are explained individually, assuming that the control unit 21 performs processes based on calculation results of respective units 22 to 27.

The memory 12 stores various maps required for control such as a deceleration speed map Mp or the like other than a required program for the controlling. In the deceleration speed map Mp, a deceleration cause and a target travelling speed after deceleration are stored to be correlated to each other. The deceleration speed map Mp is utilized, in the travelling control process which will be described later, in the case where the travelling speed is estimated when the preceding vehicle 200 is decelerating.

The preceding vehicle information acquiring unit 22 acquires information related to the travelling state and the travelling situation of the preceding vehicle 200 based on the detection result of the sensor unit 40 and the travelling situation acquiring unit 220 of the preceding vehicle 200. Also, the preceding vehicle information acquiring unit 22 acquires the preceding vehicle travelling speed pattern estimated by the travelling speed estimation ECU 60.

The following vehicle information acquiring unit 23 acquires a travelling state and the travelling situation of the following vehicle 300 based on the detection result of the sensor unit 40 and the travelling situation acquiring unit 320 of the following vehicle 300.

The energy efficiency index calculation unit 24 calculates a degree of improvement in an energy efficiency (hereinafter referred to as energy efficiency index) of the own vehicle 100 tracking the preceding vehicle 200 at a predetermined travelling speed. In the above-description, the tracking refers to both of a travel with tracking the preceding vehicle 200 by the ACC control, and a travel with tracking the preceding vehicle 200 by a coasting control. According to the present embodiment, the energy efficiency index calculation unit 24 calculates a reduction rate of a braking energy of the own vehicle 100 to be the energy efficiency index. Specifically, the energy efficiency index calculation unit 24 calculates a braking energy of the own vehicle 100 when tracking the preceding vehicle 200 by the ACC control, and a braking energy of the own vehicle 100 when tracking the preceding vehicle 200 by the coasting control to obtain the reduction rate of the braking energy, thereby calculating the energy efficiency index. The above-described predetermined travelling speed refers to a travelling speed based on a travelling speed trend (i.e. own vehicle travelling speed pattern which will be described later) when the own vehicle 100 tracks the preceding vehicle 200 by the ACC control. The detailed explanation of a calculation method of the energy efficiency index will be described later.

The tracking index calculation unit 25 calculates, when the own vehicle 100 travels based on the later-described own vehicle travelling speed pattern, a tracking index indicating a degree of trackability of the own vehicle 100 relative to the preceding vehicle 200. In the present embodiment, the tracking index calculation unit 25 calculates an average value of an intervehicle time between the own vehicle 100 and the preceding vehicle 200 to be the tracking index.

The compatibility index calculation unit 26 calculates a compatibility index indicating a degree of compatibility between the own vehicle 100 and the following vehicle 300. According to the present embodiment, compatibility refers to that the own vehicle 100 together with the following vehicle 300 efficiently travel, preventing smooth travelling of the following vehicle 300 from being disrupted due to the traveling state of the own vehicle 100. The compatibility index calculation unit 26 utilizes a difference between the travelling speed of the own vehicle 100 and the travelling speed of the following vehicle 300, and a distance between the own vehicle 100 and the following vehicle 300 (hereinafter referred to as rear intervehicle distance) to calculate the compatibility index using an equation which will be described later. The detailed explanation for a calculation method of the compatibility index will be described later.

The deceleration cause estimation unit 27 estimates a cause of deceleration of the preceding vehicle 200 (hereinafter referred to as deceleration cause). According to the present embodiment, the deceleration cause includes a traffic signal that indicates red located at a predetermined distance away from the current location of the preceding vehicle 200 in the travelling direction thereof; a cross-walk located at a predetermined distance away from the preceding vehicle in the travelling direction thereof; a road sign indicating a temporally stop, located at a predetermined distance away from the preceding vehicle in the travelling direction thereof; a toll gate or a branch road located at a predetermined distance away from the preceding vehicle in the travelling direction thereof; a change in the speed limit to be lowered in the travelling road where the preceding vehicle is travelling, and the like. These causes are based on a distance factor which requires a deceleration of the preceding vehicle 200. The above-described predetermined distance refers to 300 meters according to the present embodiment. Note that the predetermined distance may be set to any distance instead of 300 meters.

The deceleration cause estimation unit 27 estimates the deceleration cause by using information of the travelling environment of the preceding vehicle 200. The deceleration cause estimation unit 27 determines whether an object, which can be the deceleration cause, is present in the vicinity of the preceding vehicle 200 based on detection result of the imaging unit 43 and the millimeter wave radar 44, and estimates the deceleration cause in accordance with types of the object. For example, a traffic sign existing in the travelling direction of the preceding vehicle and a signal indication of the traffic sign are identified, thereby estimating the deceleration cause in which the traffic signal indicates red. Also, contents of the road sign in the travelling direction of the preceding vehicle 200 is identified, thereby estimating the deceleration cause such as temporally stop, lowered speed limit, existing toll gate or a branch road.

The deceleration cause estimation unit 27 may acquire information related to the travelling environment and the travelling state of the preceding vehicle 200 via the communication unit 50. Further, the deceleration cause estimation unit 27 may acquire traffic information such as traffic jam information or traffic regulation information of Vehicle Information and Communication System (i.e. VICS: registered trade mark), via the communication unit 50, to estimate the deceleration cause as being that the travelling road of the preceding vehicle 200 is congested with traffic.

The control unit 21 integrally controls the above-described units 22 to 27. Also, the control unit 21 utilizes the calculated indexes such as energy efficiency index, the tracking index and the compatibility index to determine whether to execute a coasting travel control of the own vehicle 100 (hereinafter referred to as coasting travel determination). Specifically, the control unit utilizes degrees of each index to determine whether to execute a coasting travel control of the own vehicle 100. Then, the control unit 21 controls the engine ECU 71 (i.e. ACC-ECU 73) based on the determination result to execute a travelling control of the own vehicle 100.

Figure 2:
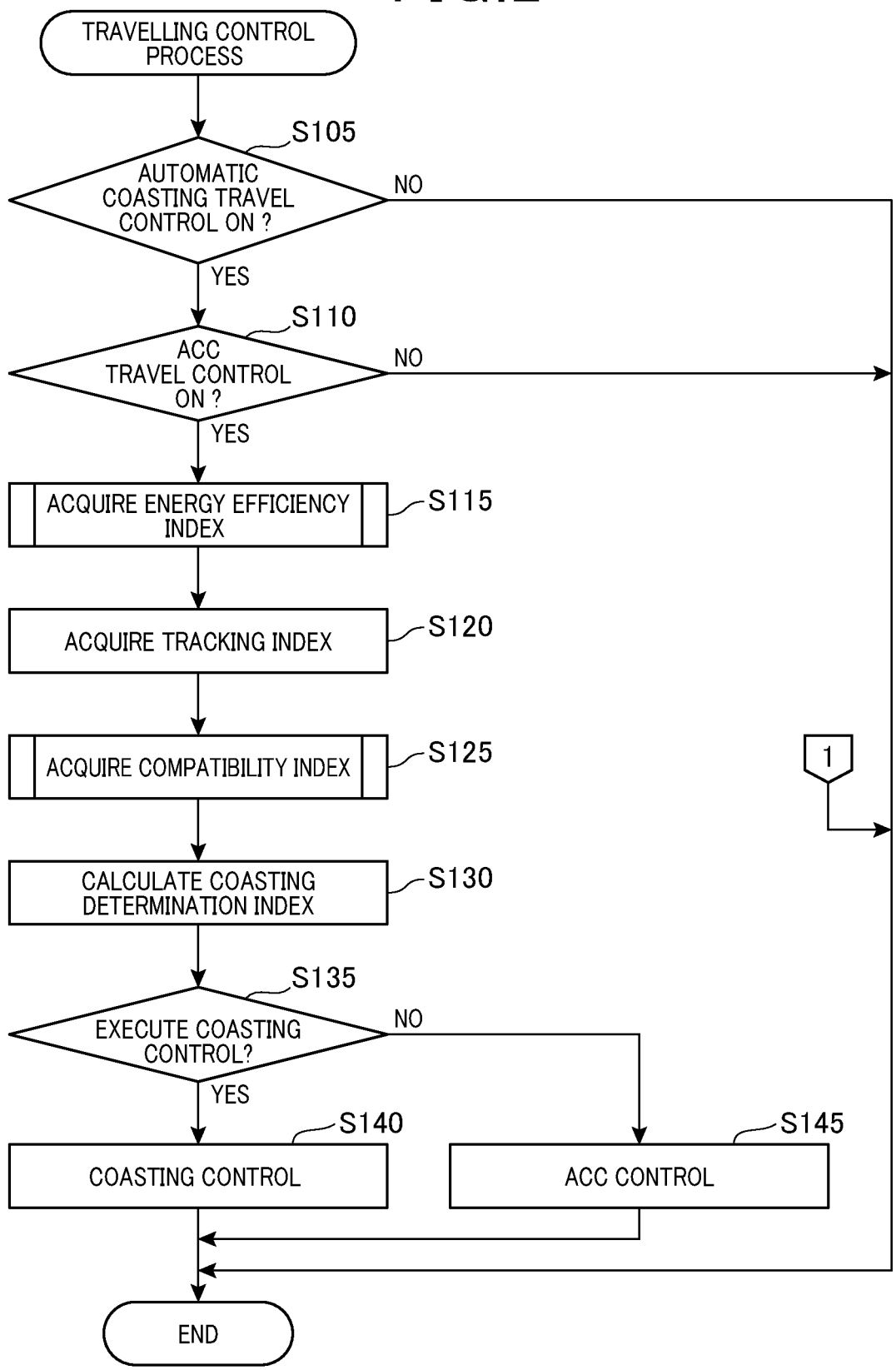
FIG. 2 is a flowchart showing a travelling control process.

The travelling control process shown in FIG. 2 is repeatedly executed once the ignition switch (not shown) of the own vehicle 100 is turned ON. The control unit 21 determines whether an automatic coasting travel control and an ACC travel control are both ON (step S105, step S110). When the process determines that the automatic coasting travel control and the ACC travel control are both ON (step S105: YES, step S110: YES), the control unit 21 acquires the energy efficiency index from the energy efficiency index calculation unit 24 as various index values of the own vehicle 100 in which relationship with the preceding vehicle 200 and the following vehicle 300 are considered (step S115), acquires the tracking index from the tracking index calculation unit 25 (step S120), and acquires the compatibility index from the compatibility index calculation unit 26 (step S125). Note that processes of steps S115 to S120 may be executed in any order.

The control unit 21 calculates a coasting determination index using various acquired indexes (step S130), and determines whether to execute the coasting control using the calculated determination index (hereinafter referred to as coasting travel determination) (step S135). The coasting control (step S140) is executed in preference to the ACC control (step S145). When these controls are completed or when the process determines that either the automatic coasting travel control or the ACC control is not ON (step S105: NO, or step S110: NO) in the above-described described step S105 and step S110, the process completes the travelling control process.

The above-described travelling control process is executed, whereby the following travelling is performed in general when the automatic travelling control and the ACC control are both ON.

(1) Coasting control is executed to improve the fuel efficiency in the case where the intervehicle distance between the preceding vehicle 200 and the own vehicle 100 is relatively large and the following vehicle 300 is travelling at a location relatively far from the own vehicle 200.

(2) The own vehicle 100 travels so as not to disturb smooth traveling of the following vehicle 300, where compatibility of the own vehicle 100 and the following vehicle 300 is in preference to the energy efficiency of the own vehicle 100 and the trackability of the own vehicle relative to the preceding vehicle 200. As a result, comfortability of driving of the own vehicle together with other vehicles are improved.

The specific contents and methods for the energy efficiency index, the tracking index, and the compatibility index which are acquired by the control unit 21 from various units 24, 25 and 26, and the coasting determination index and the coasting travelling determination, in order to accomplish the above-described travelling, will be described in the followings. Note that suffixes slf, fore, back will be applied to references of velocity V and the like in order to differentiate the own vehicle 100, the preceding vehicle 200 and the following vehicle 300. Also, when describing not only the travelling speed itself but its pattern, suffix ptn is applied to the reference, for example, $V_{slf-ptn}$.

Next, an energy efficiency index calculation process will be described. For the energy efficiency index acquired by the control unit 21 at step S115, the energy efficiency index calculation unit 24 executes an energy efficiency index calculation process shown in FIG. 3 to calculate the energy efficiency index. Specifically, the energy efficiency index calculation unit 24 acquires the travelling speed of the preceding vehicle 200 from the preceding vehicle information acquiring unit 22 (step S205). The energy efficiency index calculation unit 24 acquires, from the preceding vehicle information acquiring unit 22, a distance between the preceding vehicle 200 and the own vehicle 100 (hereinafter referred to as front intervehicle distance) (step S210). In the step S205 and step S210, the energy efficiency index calculation unit 24 may acquire the current location of the preceding vehicle 200 by the intervehicle communication between the preceding vehicle 200 and the own vehicle 100 and may acquire the travelling speed and the front intervehicle distance by using the acquired location and the current location of the own vehicle 100. Further, the above-described steps S205 and S210 may be sequentially executed in any order or may be simultaneously executed.

The energy efficiency index calculation unit 24 acquires the travelling environment of the preceding vehicle 200 from the preceding vehicle information acquiring unit 22 (step S215). The energy efficiency index calculation unit 24 may acquire information related to the travelling state and the travelling environment of the preceding vehicle 200 via the communication unit 50.

The energy efficiency index calculation unit 24 determines whether the preceding vehicle 200 decelerates or not based on the estimation of the travelling speed estimation ECU 60 (step S220). Specifically, the energy efficiency index calculation unit 24 outputs information related to the travelling speed, the front intervehicle distance and the travelling environment of the preceding vehicle 200 which have been acquired at steps S205 to S215 via the input-output interface 11, to the travelling speed estimation ECU 60, and determines whether the preceding vehicle 200 decelerates or not based on the estimation of the travelling speed estimation ECU 60.

In the memory unit of the travelling speed estimation ECU 60 which is not shown, a map is stored in which the travelling speed, the front intervehicle distance, the travelling environment and the determination of whether or not deceleration occurs are correlated. Whether the preceding vehicle 200 is decelerating or not is determined by referring to the map. For example, the energy efficiency index calculation unit 24 determines, based on the estimation of the travelling speed estimation ECU 60, that the preceding vehicle 200 will decelerate with relatively large deceleration factor, in the case where the traffic signal existing ahead of the preceding vehicle in the travelling direction thereof indicates red, and the travelling speed of the preceding vehicle 200 is relatively large. Also, the energy efficiency index calculation unit 24 determines, based on the estimation of the travelling speed estimation ECU 60, that the preceding vehicle 200 decelerates with relatively small deceleration factor, in the case where a road sign indicating a temporally stop is present ahead of the preceding vehicle 200 in the travelling direction thereof and the traveling speed of the preceding vehicle 200 is relatively small.

The travelling speed estimation ECU 60 may acquire the current location of the preceding vehicle 200 in addition to the travelling speed of the preceding vehicle 200 and the front intervehicle distance, to estimate deceleration operation of the preceding vehicle 200 based on the current location of the preceding vehicle 200 and the map including the travelling road on which the preceding vehicle will travel.

When the process determines that the preceding vehicle decelerates (step S220: YES), the energy efficiency index calculation unit 24 makes the deceleration cause estimation unit 27 estimate the deceleration cause (step S225). Specifically, the deceleration cause estimation unit 27 estimates the deceleration cause based on types (contents) of objects such as a traffic signal in the travelling environment of the preceding vehicle 200, a cross-walk, a road sign or the like.

For example, when the traffic signal is red, the deceleration cause estimation unit 27 estimates that the deceleration cause is stopping of vehicle due to red signal. Also, when a cross-walk is present ahead of the vehicle in the travelling direction thereof, the deceleration cause estimation unit 27 estimates that the deceleration cause is slow down due to passing the cross-walk. Moreover, when a road sign indicating a temporary stop is present, the deceleration cause estimation unit 27 estimates that the deceleration cause is temporary stop. For example, in the case where an electronic toll collection system (i.e. ETC) toll gate is present when the preceding vehicle 200 is travelling on a highway, the deceleration cause estimation unit 27 estimates that the deceleration cause is lowering travelling speed due to passing an ETC toll gate. Furthermore, when a road sign indicating a speed limit is present and the current travelling speed of the preceding vehicle 200 is higher than the speed limit, or when the preceding vehicle 200 changes the travelling road from the highway to a branch road proceeding to the exit of the highway, the deceleration cause estimation unit 27 estimates that the deceleration cause is lowering travelling speed due to a change in the speed limit.

The above-described step S225 may be configured to make the travelling speed estimation ECU 60 estimate the deceleration cause. According to the configuration, the energy efficiency index calculation unit 24 may acquire the deceleration cause estimated by the travelling speed estimation ECU 60. Note that the deceleration cause estimated at step S225 is sometimes referred to as deceleration cause α in the following description.

The energy efficiency index calculation unit 24 estimates the travelling speed of the preceding vehicle 200 after deceleration based on the estimated deceleration cause α (step S230). Specifically, the energy efficiency index calculation unit 24 refers to the deceleration speed map Mp stored in the memory 12 and acquires a target travelling speed $V_{fore\text{-}trg}$ which is correlated to the estimated deceleration cause α. The target travelling speed $V_{fore\text{-}trg}$ refers to a target travelling speed after the start of deceleration.

For example, when the deceleration cause α is stopping of the vehicle such as stop due to red signal and temporary stop, the deceleration target travelling speed after deceleration $V_{fore\text{-}trg}$ corresponds to 0 kilometers/hour. For example, when the deceleration cause α is lowering travelling speed due to passing an ETC (electronic toll collection system) toll gate and lowering travelling speed due to a change in the speed limit, the target travelling speed $V_{fore\text{-}trg}$ after the deceleration corresponds to the speed limit. Also, for example, when the deceleration cause α is slow down due to passing the cross-walk, and slow down due to right/left turn at an intersection, the target travelling speed $V_{fore\text{-}trg}$ after the deceleration corresponds to 5 kilometers/hour or 10 kilometers/hour.

The target travelling speed $V_{fore\text{-}trg}$ after the deceleration is not limited to the above-described examples, but the target travelling speed $V_{fore\text{-}trg}$ may be set to a travelling speed in accordance with statistical information for the deceleration cause α. For example, when the vehicle passes through an ETC toll gate, generally, the travelling speed is less than or equal to 20 kilometers/hour. Hence, the target travelling speed $V_{fore\text{-}trg}$ after the deceleration may be set to 20 kilometer/hour in the case where the deceleration cause α is that lowering travelling speed due to passing an ETC toll gate. Also, since the speed limit for a travelling road proceeding the highway exit is generally 40 kilometer/hour, when the deceleration cause α is that lowering speed due to passing through the exit of highway, the travelling speed may be set to 40 kilometer/hour. Alternatively, statistical information about the travelling speed when the vehicle passes through the road proceeding the highway exist may be acquired in advance, and the travelling speed may be arbitrarily set based on the statistical information.

The energy efficiency index calculation unit 24 acquires the preceding vehicle travelling speed pattern from the travelling speed estimation ECU 60 via the preceding vehicle information acquiring unit 22 (step S235). The preceding vehicle travelling speed pattern is defined as an equation of an estimation model where a change in the travelling speed of the preceding vehicle 200 is estimated for a travel distance from the current location of the preceding vehicle 200 to a location at which the travelling speed of the preceding vehicle 200 reaches the deceleration target travelling speed after deceleration $V_{fore\text{-}trg}$. Note that the location at which the preceding vehicle starts to decelerate is determined depending on the travel distance during which the current travelling speed $V_{fore\text{-}trg}$ reaches the deceleration target travelling speed $V_{fore\text{-}trg}$. At step S235, the travelling speed estimation ECU 60 calculates, with an experiment, an amount of required velocity for lowering the current travelling speed of the preceding vehicle 200 to be the deceleration travelling speed $V_{fore\text{-}trg}$ and a travel distance up to the target location, and estimates a change in the travelling speed from the current travelling speed $V_{fore}$ to the target travelling speed $V_{fore\text{-}trg}(V_{fore}, \ldots, V_{fore\text{-}trg})$ as the following equation (1).

$$V_{fore\text{-}ptn} = f_{fore}(V_{fore}, V_{fore\text{-}trg}, I_{fore}, \alpha) \quad (1)$$

In the above-described equation (1), $V_{fore\text{-}ptn}$ is a preceding vehicle travelling speed pattern. Further, the $f_{fore}$ is an estimation model, $V_{fore}$ is the current travelling speed, $V_{fore\text{-}trg}$ is the deceleration target travelling speed, the $I_{fore}$ is an additional parameter, and $\alpha$ is a deceleration cause. The additional parameter $I_{fore}$ is a parameter required for estimating the preceding vehicle travelling speed pattern $V_{fore\text{-}ptn}$ taking a travelling state of a pre-preceding vehicle travelling speed pattern into consideration. For example, the additional parameter $I_{fore}$, corresponds to an intervehicle distance between the preceding vehicle 200 and the vehicle in front of the preceding vehicle.

Figure 4:
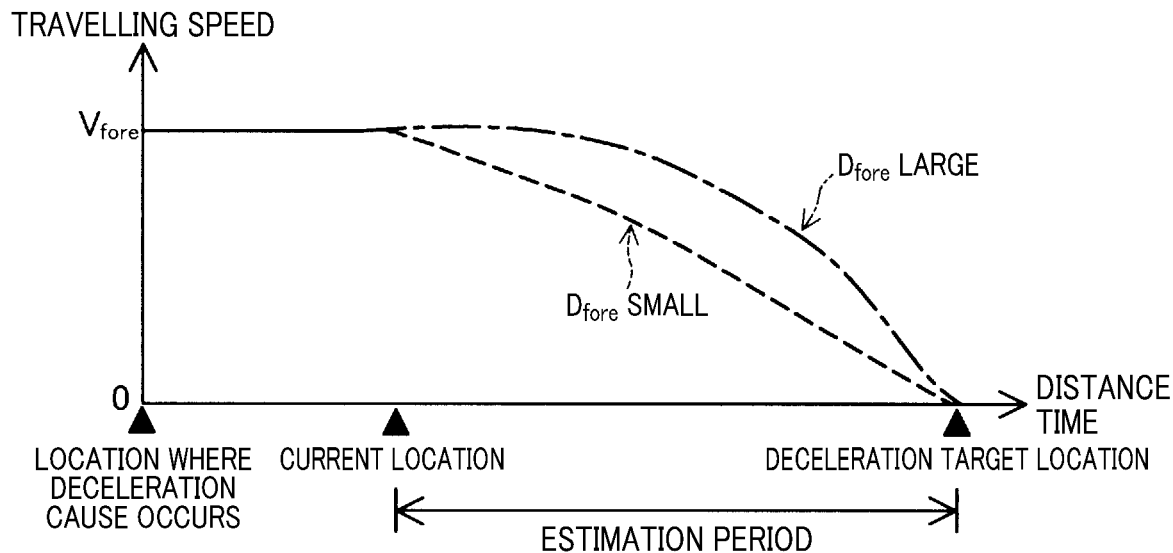
FIG. 4 is a diagram schematically showing a preceding vehicle travelling speed pattern.
Figure 5:
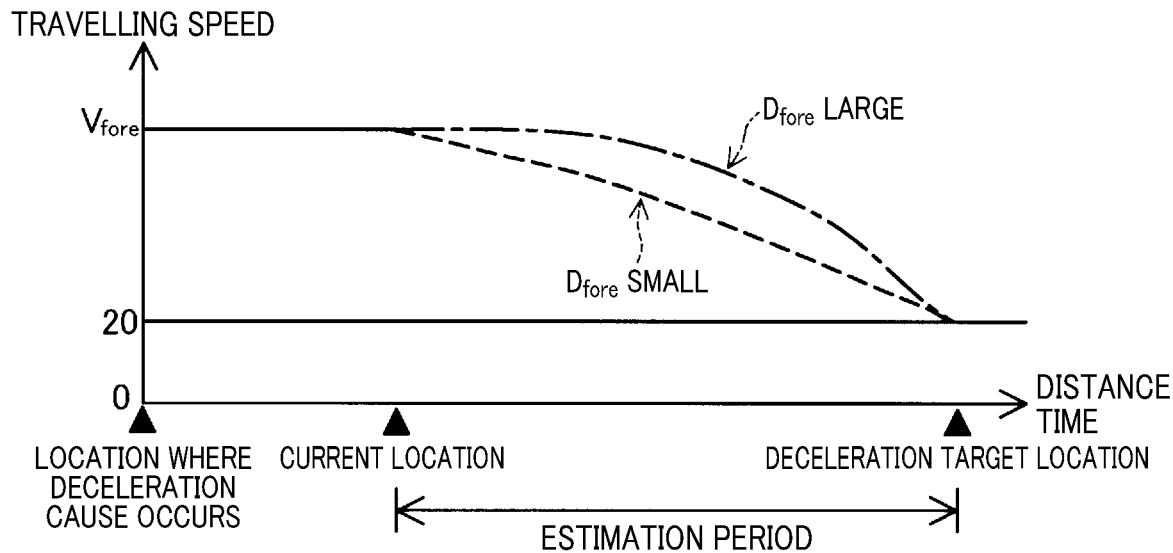
FIG. 5 is a diagram schematically showing a preceding vehicle travelling speed pattern.
Figure 6:
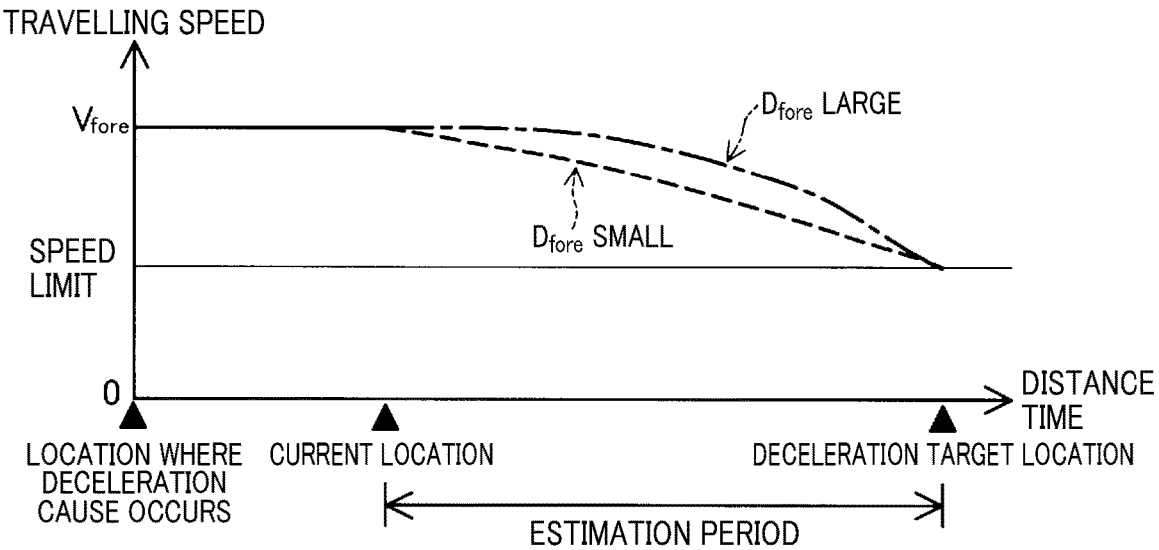
FIG. 6 is a diagram schematically showing a preceding vehicle travelling speed pattern.

With reference to FIGS. 4 to 6, the preceding vehicle travelling speed pattern $V_{fore\text{-}ptn}$ will be described for each deceleration cause $\alpha$ in more detail.

FIG. 4 illustrates the preceding vehicle travelling speed pattern $V_{fore\text{-}ptn}$ in the case where the deceleration cause $\alpha$ corresponds to stopping of the vehicle such as stop due to red signal and temporary stop due to road sign. FIG. 5 illustrates the preceding vehicle travelling sped pattern $V_{fore\text{-}ptn}$ in the case where the deceleration cause $\alpha$ corresponds lowering travelling speed due to passing an ETC toll gate. FIG. 6 illustrate the preceding vehicle travelling speed pattern $V_{fore\text{-}ptn}$ in the case where the deceleration cause $\alpha$ corresponds to lowering travelling speed due to a change in the speed limit. In FIGS. 4 to 6, as the additional parameter in the equation (1), an intervehicle distance $D_{fore}$ between the preceding vehicle 200 and the pre-preceding vehicle is used. In FIGS. 4 to 6, the vertical axis indicates the travelling speed of the preceding vehicle 200 and the horizontal axis indicates the travel distance of the preceding vehicle 200 and the time. The solid line indicates the actual traffic lane. The dashed line and the dotted line indicate a travelling speed estimated by the above-described equation (1). The dashed line indicates a change in the travelling speed estimated when the intervehicle distance $D_{fore}$ is relatively large. The dotted line indicates a change in the travelling speed estimated when the intervehicle distance $D_{fore}$ is relatively small.

As indicated by the solid line in FIG. 4, the travelling speed of the preceding vehicle 200 is kept at $V_{fore}$ kilometer/hour in locations from a deceleration cause occurring location to the current location. When deceleration is started at the current location, the travelling speed of the preceding vehicle 200 is estimated to decrease towards the deceleration target location to reach 0 kilometer/hour which is the target travelling speed at the deceleration target location. Generally, since the vehicle is travelled in accordance with a behavior of the preceding vehicle, the deceleration trend of the travelling speed varies depending on the intervehicle distance $D_{fore}$. Therefore, for example, as indicated with the dashed line, when the intervehicle distance $D_{fore}$ is relatively large, because the start timing of the deceleration is late, it is estimated that the vehicle decelerates with large deceleration factor. On the other hand, as indicated with the dotted line, when the intervehicle distance $D_{fore}$ is relatively small, compared to the case where the intervehicle distance $D_{fore}$ is large, the start timing of the deceleration is early, it is estimated that the vehicle decelerates with small deceleration factor. Note that the estimation period indicated in the horizontal axis refers to a period from the current location to the deceleration target location, and refers to a time to reach the deceleration target travelling speed $V_{fore\text{-}trg}$.

As indicated with the solid line in FIG. 5, the travelling speed of the preceding vehicle 200 is $V_{fore}$ kilometer/hour in locations from a deceleration cause occurring location to the current location. When the vehicle starts to decelerate at the current location, the travelling speed of the preceding vehicle 200 is estimated to decrease towards the deceleration target location to reach 20 kilometer/hour which is the target travelling speed at the deceleration target location. Similar to the example shown in FIG. 4, the deceleration trend of the travelling speed varies depending on the intervehicle distance $D_{fore}$. For example, as indicated with the dashed line in FIG. 5, when the intervehicle distance $D_{fore}$ is relatively large, because the start timing of the deceleration is late, it is estimated that the vehicle decelerates with large deceleration factor. On the other hand, as indicated with the dotted line, when the intervehicle distance $D_{fore}$ is relatively small, compared to the case where the intervehicle distance $D_{fore}$ is large, the start timing of the deceleration is early, it is estimated that the vehicle decelerates with small deceleration factor.

As indicated with the solid line in FIG. 6, the travelling speed of the preceding vehicle 200 shows $V_{fore}$ kilometer/hour in locations from a deceleration cause occurring location to the current location. When the vehicle starts to decelerate at the current location, the travelling speed of the preceding vehicle 200 is estimated to decrease towards the deceleration target location to reach a speed limit which is the target travelling speed at the deceleration target location. Similar to the examples shown in FIGS. 4 and 5, deceleration trend of the travelling speed varies depending on the intervehicle distance $D_{fore}$. For example, as indicated with the dashed line in FIG. 6, when the intervehicle distance $D_{fore}$ is relatively large, because the start timing of the deceleration is late, it is estimated that the vehicle decelerates with large deceleration factor. On the other hand, as indicated with the dotted line, when the intervehicle distance $D_{fore}$ is relatively small, compared to the case where the intervehicle distance $D_{fore}$ is large, the start timing of the deceleration is early, it is estimated that the vehicle decelerates with small deceleration factor.

Figure 3:
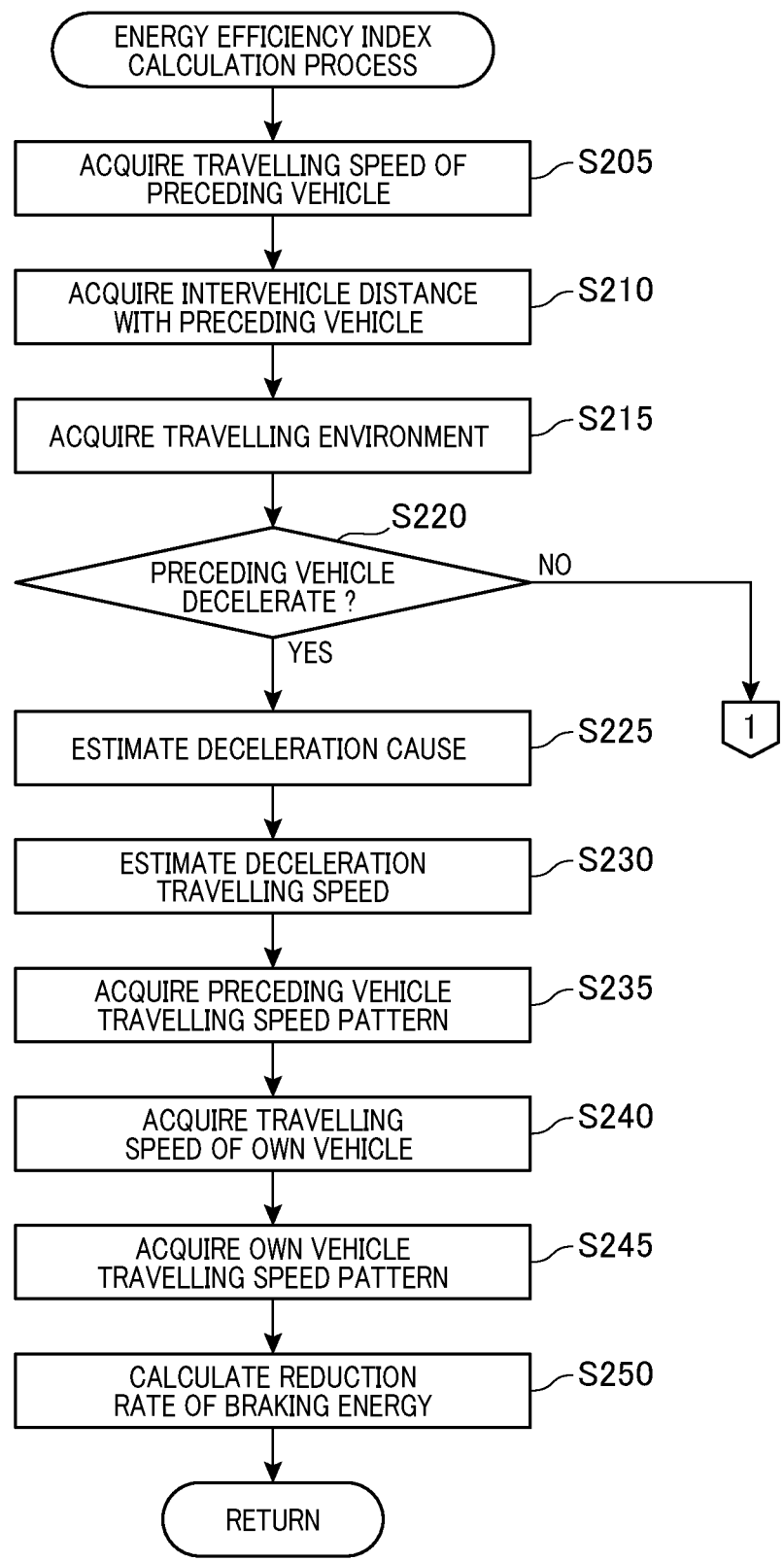
FIG. 3 is a flowchart showing an energy efficiency index calculation process.

Referring back to the explanation of the energy efficiency index calculation process shown in FIG. 3, at the above-described step S235, the travelling speed estimation ECU 60 estimates the preceding vehicle travelling speed pattern $V_{fore\text{-}ptn}$. Thereafter, the travelling speed estimation ECU 60 outputs the preceding vehicle travelling speed pattern $V_{fore\text{-}ptn}$ to the preceding vehicle information acquiring unit 22 via the input-output interface 11.

The energy efficiency index calculation unit 24 acquires the travelling speed of the own vehicle 100 from the travelling speed sensor 42 (step S240). The energy efficiency index calculation unit 24 utilizes the traveling speed of the own vehicle 100 acquired at step S240 to acquire an own vehicle travelling speed pattern (step S245). In the present embodiment, the own vehicle travelling speed pattern refers to a travelling speed and an acceleration factor of the own vehicle 100 in the estimation period in the case where the preceding vehicle 200 travels based on the preceding vehicle travelling speed pattern and the own vehicle 100 travels in accordance with the ACC control, following the preceding vehicle 100. The travelling speed estimation ECU 60 calculates the acceleration factor of the own vehicle 100 such that the own vehicle 100 tracks the travelling state (behavior) of the preceding vehicle 200 which changes in real time based on the preceding vehicle travelling speed pattern $V_{fore-ptn}$, and a target intervehicle time of the own vehicle 100 becomes an ACC setting time, thereby calculating the own vehicle travelling speed pattern $V_{slf-ptn}$. The own vehicle travelling speed pattern $V_{slf-ptn}$. The own vehicle travelling speed pattern $V_{slf-ptn}$ is calculated by simulating the travelling speed and the acceleration factor of the own vehicle 100 using parameters including the preceding vehicle traveling speed pattern $V_{fore-ptn}$ the current travelling speed of the own vehicle, and the ACC setting time of the own vehicle.

The energy efficiency index calculation unit 24 calculates a reduction rate of a braking energy of the own vehicle 100 to be the energy efficiency index (step S250). Specifically, firstly, the energy efficiency index calculation unit 24 calculates a braking energy $A_{acc}$ estimated to be required when the own vehicle 100 travels with the ACC control based on the own vehicle travelling speed pattern $V_{slf-ptn}$ and a braking energy $A_{cst}$ estimated to be required when the own vehicle 100 travels with the coasting control within an estimation period based on the own vehicle travelling speed pattern $V_{slf-ptn}$. Then, the energy efficiency index calculation unit 24 calculates the reduction rate between the braking energy $A_{cst}$ and the braking energy $A_{acc}$ based on the following equation (2) to acquire the energy efficiency index $C_{ene}$.

$$C_{ene}=A_{cst}/A_{acc} \qquad (2)$$

According to the present embodiment, the same amount is calculated between the braking energy $A_{acc}$ and the braking energy $A_{cst}$. Note that the coasting control when calculating the braking energy $A_{cst}$ includes a case where the coasting control changes to the ACC control to perform a tracking travel when the own vehicle 100 excessively approaches the preceding vehicle 200.

In the present embodiment, the braking energy is utilized as the energy efficiency index $C_{ene}$, because of the following reason. According to the present disclosure, the own vehicle 100 performs deceleration with coasting not braking. Hence, the travelling control unit 10 has a purpose to completely consume the energy for driving the own vehicle forward. Accordingly, a case where the braking is performed after consuming the energy for travelling the own vehicle 100 and a case where the energy is consumed with the coasting travel can be compared, whereby the effect on the energy efficiency can be realized.

The energy efficiency index $C_{ene}$ may be a reduction rate of a driving energy instead of the reduction rate of the braking energy. According to this configuration, an energy converting efficiency of each of components which transmit the energy such as the engine 18, the inverter 87, the MG 83 and the transmission 85 is stored in the memory 12 in advance, and the driving energy required for the ACC control and the driving energy required for the coasting control are calculated by using the energy converting efficiency, thereby calculating the reduction rate of the driving energy.

As shown in FIG. 3, when determined that the preceding vehicle 200 does not decelerate at step S220 (step S220:

NO), the energy efficiency index calculation process is terminated, and as shown in FIG. 2, the control unit 21 terminates the travelling control process without executing processes at steps S120 to S145. As shown in FIG. 3, after executing the above-described process at step S250, the energy efficiency index calculation process is terminated. Since the energy efficiency index calculation unit 24 repeatedly executes the processes shown in FIG. 3, the control unit 21 is able to receive, whenever required, the energy efficiency index $C_{ene}$ of the own vehicle 100 from the energy efficiency index calculation unit 24.

The tracking index calculation process will be described as follows. The tracking index acquired by the control unit 21 at step S120 shown in FIG. 2 is calculated by the tracking index calculation unit 25 as follows. Specifically, the tracking index calculation unit 25 calculates an average value $B_{acc}$ of an intervehicle time when the own vehicle 100 travels with the ACC control based on the own vehicle travelling speed pattern $V_{slf-ptn}$ and an average value $B_{cst}$ of an intervehicle time when the own vehicle travels with the coasting control within an estimation period based on the own vehicle travelling speed pattern $V_{slf-ptn}$. Then, the tracking index calculation unit 25 calculates an change amount of the average intervehicle time $B_{cst}$ relative to the average intervehicle time $B_{acc}$ to be a tracking index $C_{drb}$.

$$C_{drb}=(B_{acc}-B_{cst})/B_{acc}\ (B_{acc}\geq B_{cst}) \qquad (3-1)$$

$$C_{drb}=(B_{cst}-B_{acc})/B_{acc}\ (B_{acc}<B_{cst}) \qquad (3-2)$$

In the above equations (3-1) and (3-2), $B_{acc}$ is an average value of the intervehicle time when the own vehicle 100 performs the ACC control within the estimation period. $B_{cst}$ is an average value of the intervehicle time when the own vehicle 100 performs the coasting control within the estimation period. In the above-equations (3-1) and (3-2), the tracking index $C_{drb}$ can be calculated as a change in the average intervehicle time $B_{cst}$ when performing the coasting control relative to the average intervehicle time $B_{acc}$ when performing the ACC control. According to this configuration, the tracking index $C_{drb}$ can be calculated considering travelling situations of a case where the own vehicle 100 is too far from the preceding vehicle 200, and a case where the own vehicle 100 is too close to the preceding vehicle.

A compatibility index calculation process will be described as follows.

For the compatibility index acquired by the control unit 21 at step S125 shown in FIG. 2, the compatibility index calculation unit 26 executes a compatibility index calculation process to calculate the compatibility index. Specifically, firstly, the compatibility index calculation unit 26 acquires a rear intervehicle distance from the following vehicle information acquiring unit 23 (step S305). The compatibility index calculation unit 26 determines whether the acquired rear intervehicle distance is larger than or equal to a predetermined intervehicle distance (step S310). According to the present embodiment, the predetermined intervehicle distance refers to 10 meters. Note that the predetermined intervehicle distance may be set to any amount of distance instead of 10 meters. In step S310, when the process determines that the acquired rear intervehicle distance is smaller than the predetermined intervehicle distance (step S310: NO), the compatibility index calculation process is terminated, and the control unit terminates the travelling control process without executing processes of steps S130 to S145 as shown in FIG. 2.

In contrast, when the process determines that the acquired rear intervehicle distance is larger than or equal to the predetermined intervehicle distance (step S310: YES), the compatibility index calculation unit 26 acquires, from the following vehicle information acquiring unit 23, a travelling speed of the following vehicle 300 (step S315). In the steps S305 and S315, the compatibility index calculation unit 26 may acquire, from the travelling situation acquiring unit 320 of the following vehicle 300 via the communication unit 50, the rear intervehicle distance and the travelling speed of the following vehicle 300. Alternatively, the compatibility index calculation unit 26 may acquire the current location of the following vehicle 300 using an intervehicle communication with the following vehicle 300, and may acquire the travelling speed and the rear intervehicle distance by using the acquired location and the current location of the own vehicle 100.

The compatibility index calculation unit 26 calculates the compatibility index based on the following equations (4), (5) and (6) (step S320).

$$C_{back} = \min(V_{slf} - V_{back}, 0)/V_{th\text{-}slf\text{-}back} \quad (4)$$

In the above equation (4), $C_{back}$ refers to an compatibility index with the following vehicle 300. $V_{slf}$ refers to the travelling speed of the own vehicle 100, $V_{back}$ refers to the travelling speed of the following vehicle 300, $V_{th\text{-}slf\text{-}back}$ refers to a threshold. According to the present embodiment, the threshold $V_{th\text{-}slf\text{-}back}$ refers to a threshold of a travelling speed difference between the travelling speed $V_{slf}$ of the own vehicle 100 and the travelling speed $V_{back}$ of the following vehicle 300. For example, the threshold $V_{th\text{-}slf\text{-}back}$ is set to 10 kilometer/hour. Note that the threshold $V_{th\text{-}slf\text{-}back}$ may be set to any value instead of 10 kilometer/hour. In the above equation (4), min (a,b) is a function that acquires minimum value between a and b.

$$C_{back} = D_{th\text{-}back}/D_{back} \quad (5)$$

In the above equation (5), $C_{back}$ is a compatibility index with the following vehicle 300. $D_{th\text{-}back}$ refers to a threshold and $D_{back}$ refers to a rear intervehicle distance. According to the present embodiment, the threshold $D_{th\text{-}back}$ refers to a threshold of the rear intervehicle distance, and is set to 5 meters for example. Note that the threshold $D_{th\text{-}back}$ may be set to any value instead of 5 meters.

$$C_{back} = (V_{slf}(t_{now}-1) - V_{slf}(t_{now}))/(V_{back}(t_{now}-1) - V_{back}(t_{now})) \quad (6)$$

In the above equation (6), $C_{back}$ refers to a compatibility index with the following vehicle 300. $V_{slf}$ refers to a travelling speed of the own vehicle 100, $V_{back}$ refers to a travelling speed of the following vehicle 300, and $t_{now}$ refers to a detection timing of the travelling speed. In the above equation (6), the compatibility index is calculated based on a difference between the traveling speed detected at previous time and the travelling speed detected at the current time. For example, the travelling speed is detected at every predetermined period and the detected travelling speed is stored in the memory 12, whereby the difference between the travelling speed at the previous time or before the previous time, and the travelling speed of the current time can be calculated.

Figure 8:
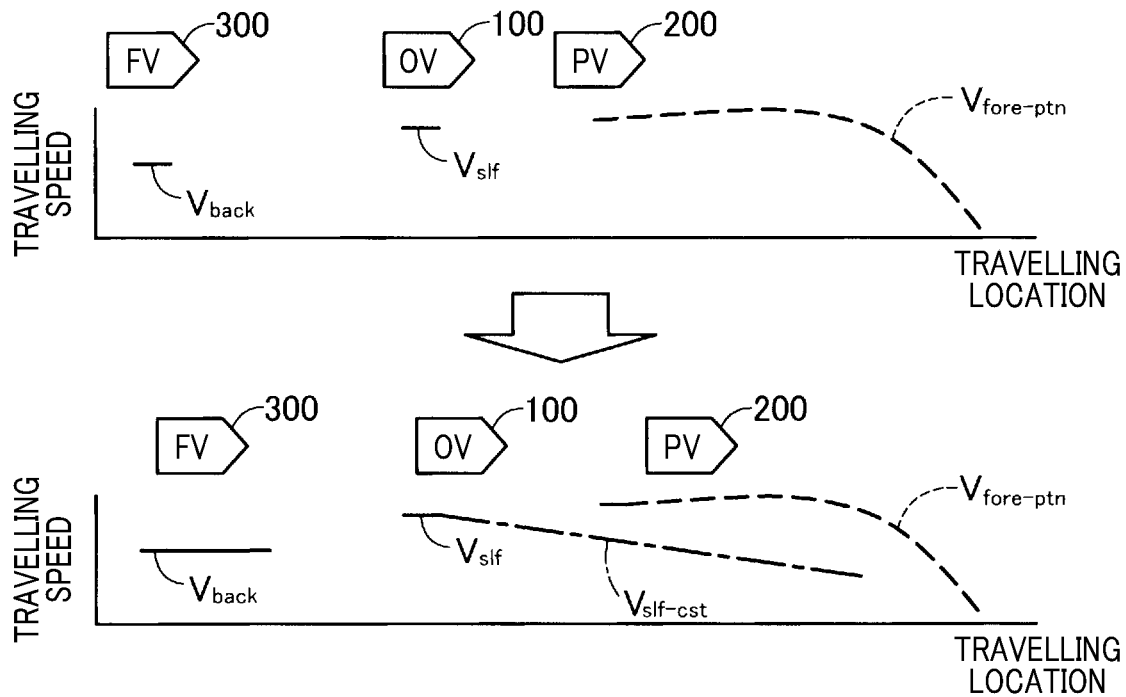
FIG. 8 is an explanatory diagram schematically showing an example of a calculation of the compatibility index based on an equation (4)
Figure 9:
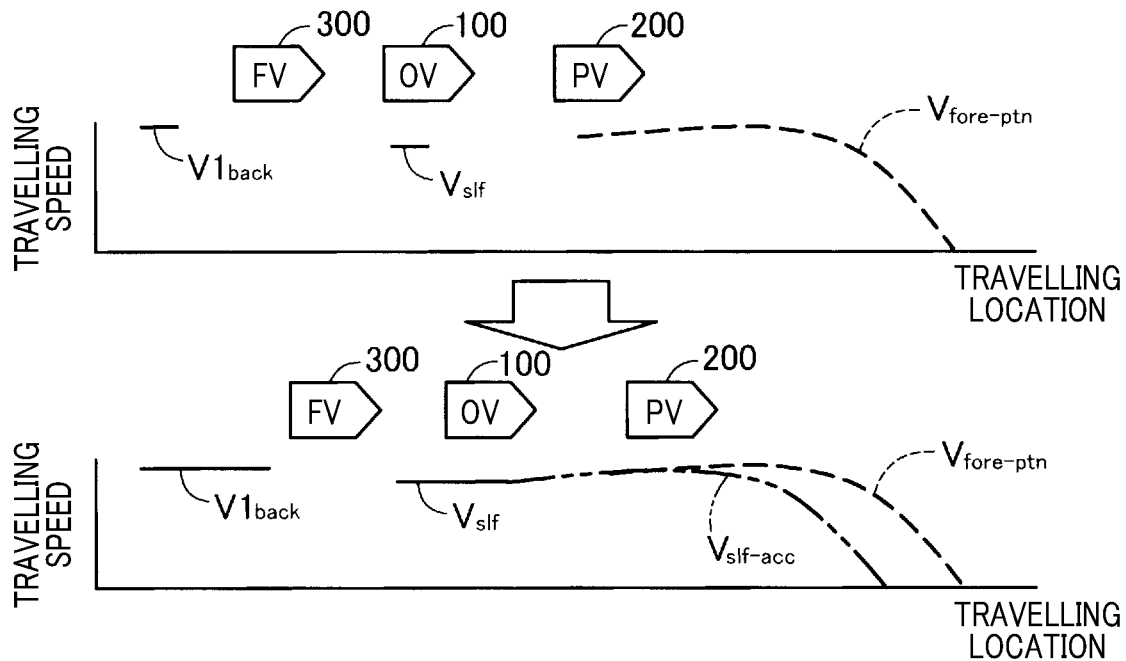
FIG. 9 is an explanatory diagram schematically showing another example of a calculation of the compatibility index based on the equation (4)
Figure 10:
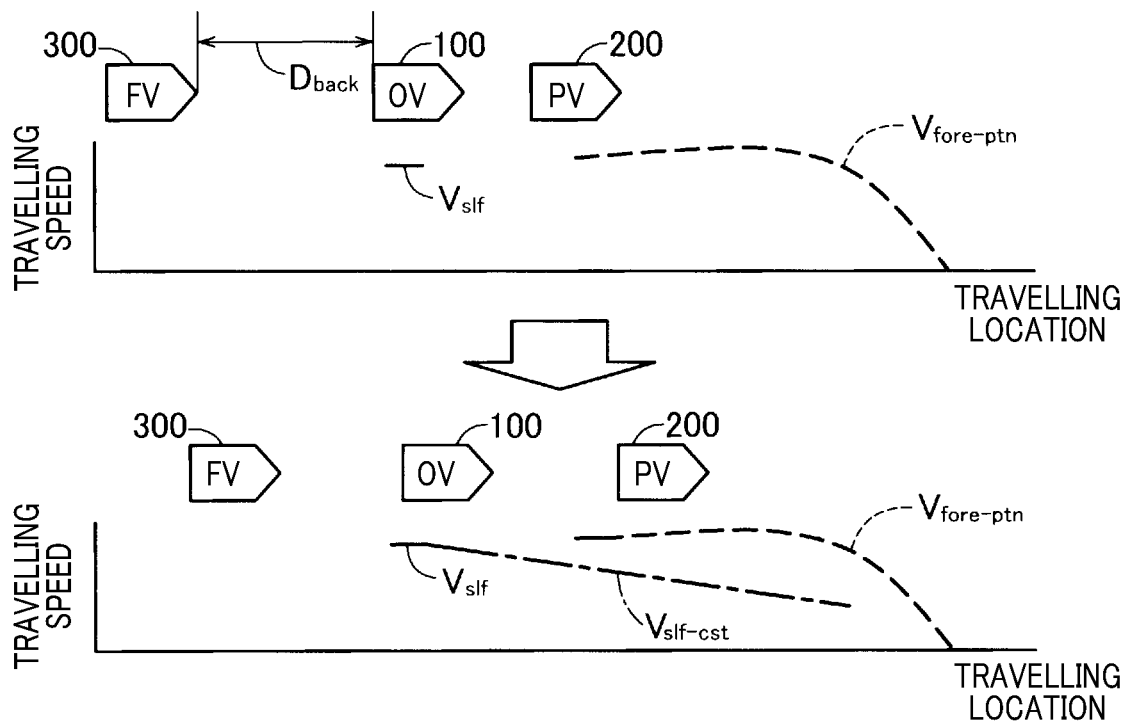
FIG. 10 is an explanatory diagram schematically showing an example of a calculation of the compatibility index based on an equation (5)
Figure 11:
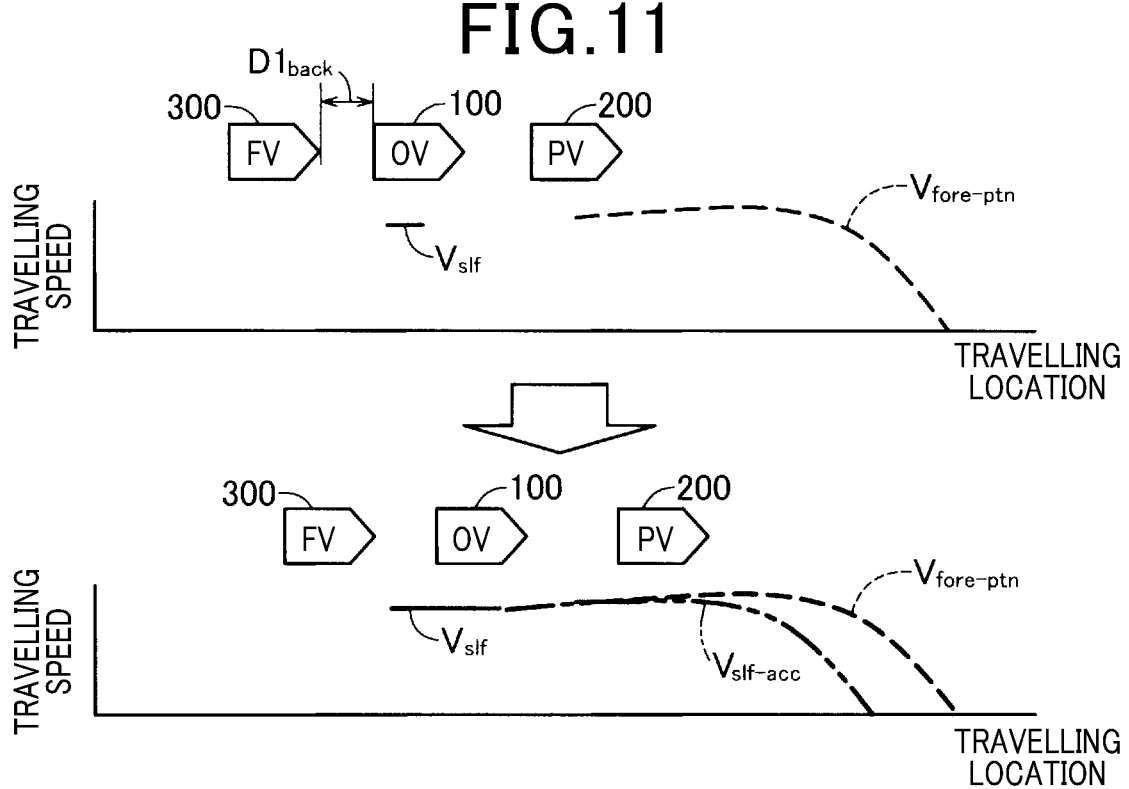
FIG. 11 is an explanatory diagram schematically showing another example of a calculation of the compatibility index based on the equation (5)
Figure 12:
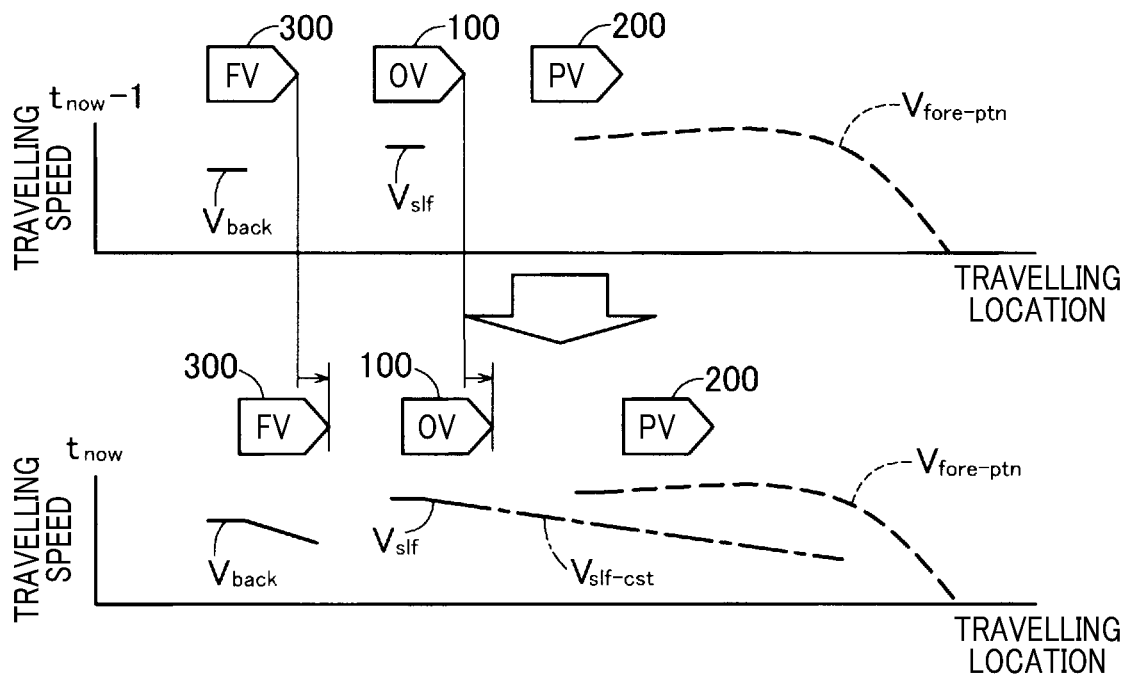
FIG. 12 is an explanatory diagram schematically showing an example of a calculation of the compatibility index based on an equation (6)
Figure 13:
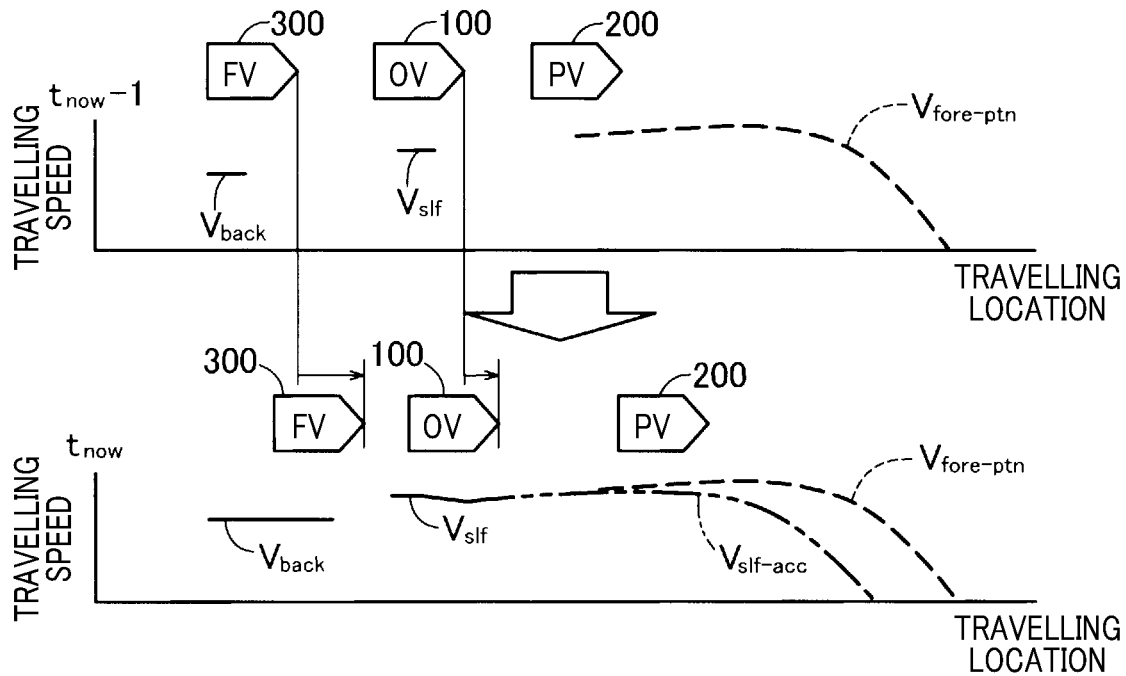
FIG. 13 is an explanatory diagram schematically showing another example of a calculation of the compatibility index based on the equation (6)

With reference to FIGS. 8 to 13, principles of the above equations (4), (5) and (6) will be described. FIGS. 8 and 9 illustrate state of the own vehicle 100 and the preceding vehicle 200 in the case where the compatibility index $C_{back}$ is calculated based on the above equation (4). FIGS. 10 and 11 illustrate state of the own vehicle 100 and the preceding vehicle 200 in the case where the compatibility index $C_{back}$ is calculated based on the above equation (5). FIGS. 12 and 13 illustrate state of the following vehicle 300, the own vehicle 100 and the preceding vehicle 200 in the case where the compatibility index $C_{back}$ is calculated based on the above equation (6). In the upper and lower portions through FIGS. 8 to 13, the vertical axis indicates the travelling speed and the horizontal axis indicates the travelling location.

In the upper portion of FIG. 8, current travelling situation of the following vehicle 300, the own vehicle 100 and the preceding vehicle 200 are illustrated. The lower portion of FIG. 8 illustrates a state where the own vehicle 100 performs a coasting control when the preceding vehicle travels based on the preceding vehicle travelling speed pattern $V_{fore\text{-}ptn}$. As shown in the upper portion of FIG. 8, the following vehicle 300 travels at the travelling speed $V_{back}$, and the own vehicle 100 travels ahead of the following vehicle 300 at a travelling speed $V_{slf}$ larger than the travelling speed $V_{back}$. The preceding vehicle 200 decelerates based on the preceding vehicle travelling speed pattern $V_{fore\text{-}ptn}$ as indicated by the dotted line. The following vehicle 300 travels at a travelling speed which is relatively lower than that of the own vehicle 100.

Accordingly, even when the own vehicle 100 pays less attention to the following vehicle 300, travelling of the own vehicle 100 is unlikely to disturb the travelling of the following vehicle 300. Hence, in the case where the following vehicle 300 travels at a travelling speed lower than that of the own vehicle 100, a relatively small amount of value is acquired when calculating the compatibility index $C_{back}$. In this case, as shown in lower portion of FIG. 8, the own vehicle 100 executes the coasting control based on the own vehicle travelling speed pattern $V_{slf\text{-}cst}$, whereby energy efficiency of the own vehicle 100 is improved, and compatibility with the following vehicle 300 can be prevented from decreasing.

In the upper portion of FIG. 9, current travelling situation of the following vehicle 300, the own vehicle 100 and the preceding vehicle 200 are illustrated. The lower portion of FIG. 9 illustrates a case where the own vehicle 100 performs an ACC control when the preceding vehicle 200 travels based on the preceding vehicle travelling speed pattern $V_{fore\text{-}ptn}$. As shown in the upper portion of the FIG. 9, the following vehicle 300 travels at the travelling speed $V1_{back}$, and the own vehicle 100 travels ahead of the following vehicle 300 at a travelling speed $V_{slf}$ smaller than the travelling speed $V1_{back}$. The preceding vehicle 200 decelerates based on the preceding vehicle travelling speed pattern $V_{fore\text{-}ptn}$. The following vehicle 300 travels at a travelling speed relatively higher than that of the own vehicle 100.

Therefore, the own vehicle 100 possibly disturbs smooth travelling of the following vehicle 300 depending on the travelling state of the own vehicle 100, if the own vehicle 100 pays insufficient attention to the following vehicle 300. Hence, when the following vehicle 300 travels at relatively higher travelling speed than that of the own vehicle 100, relatively larger value will be calculated if the compatibility index $C_{back}$ is calculated with the above equation (4). In this case, as shown in the lower portion of FIG. 9, the own vehicle 100 executes the ACC control based on the own vehicle travelling speed pattern $V_{slf\text{-}acc}$, thereby suppressing a decrease in the compatibility with the following vehicle 300.

In the above equation (4), the compatibility index $C_{back}$ is calculated based on a travelling speed difference between the own vehicle 100 and the following vehicle 300. Hence, in the case where a travelling speed difference between both vehicles 100 and 300 is small and the travelling speed of the following vehicle is large, the own vehicle 100 needs to more carefully take into account the behaviour of the following vehicle 300.

In the upper portion of FIG. 10, the current travelling situation of the following vehicle 300, the own vehicle 100 and the preceding vehicle 200 is illustrated. In the lower portion of FIG. 10, a case is illustrated in which the own vehicle 100 performs a coasting control when the preceding vehicle 200 travels based on the preceding vehicle travelling speed pattern $V_{fore-ptn}$. As shown in the upper portion of FIG. 10, the following vehicle 300 and the own vehicle 100 each travels such that the rear intervehicle distance becomes relatively large distance $D_{back}$. The travelling speed of the own vehicle 100 is travelling speed $V_{slf}$. The preceding vehicle 200 decelerates based on the preceding vehicle travelling speed pattern $V_{fore-ptn}$ as indicated with the dotted line. As described above, since the rear intervehicle distance is relatively large, the following vehicle 300 travels at a location relatively apart from the own vehicle 100.

Therefore, even when the own vehicle 100 pays less attention to the following vehicle 300, travelling of the own vehicle 100 is unlikely to disturb the travelling of the following vehicle 300. Hence, when the rear intervehicle distance is relatively large, if the compatibility index $C_{back}$ is calculated with the above equation (5), relatively small value is calculated. In this case, as shown in the lower portion of FIG. 10, the own vehicle 100 executes the coasting control based on the own vehicle travelling speed pattern $V_{slf-cst}$, whereby the energy efficiency of the own vehicle 100 is improved, and compatibility with the following vehicle 300 can be prevented from decreasing.

In the upper portion of FIG. 11, the current travelling situation of the following vehicle 300, the own vehicle 100 and the preceding vehicle 200 is illustrated. In the lower portion of FIG. 11, a case is illustrated in which the own vehicle 100 performs an ACC control when the preceding vehicle 200 travels based on the preceding vehicle travelling speed pattern $V_{fore-ptn}$. As shown in the upper portion of FIG. 11, the following vehicle 300 and the own vehicle 100 each travel such that the rear intervehicle distance becomes a relatively small distance $D1_{back}$. The travelling speed of the own vehicle 100 is the travelling speed $V_{slf}$. The preceding vehicle 200 decelerates based on the preceding vehicle travelling speed pattern $V_{fore-ptn}$ as indicated with the dotted line. As described above, since the rear intervehicle distance is relatively small, the following vehicle 300 travels at a location relatively close to the own vehicle 100.

Therefore, the own vehicle 100 possibly disturbs smooth travelling of the following vehicle 300 depending on the travelling state of the own vehicle 100, if the own vehicle pays insufficient attention to the following vehicle 300. Hence, relatively larger value will be calculated if the compatibility index $C_{back}$ is calculated with the above equation (5). In this case, as shown in the lower portion of FIG. 11, the own vehicle 100 executes the ACC control based on the own vehicle travelling speed pattern $V_{slf-acc}$, thereby suppressing a decrease in the compatibility with the following vehicle 300.

In the following equation (5), the compatibility index $C_{back}$ is calculated based on the rear intervehicle distance. Therefore, when the rear intervehicle distance becomes smaller, the own vehicle 100 needs to pay more attention to the following vehicle 300.

In the upper portion of FIG. 12, the travelling situation of the own vehicle 100 and the preceding vehicle 200 at the previous time $t_{now}-1$ is illustrated. In the lower portion of FIG. 12, the travelling situation of the own vehicle 100 and the preceding vehicle 200 at the current time $t_{now}$ is illustrated. As shown in the upper portion of FIG. 12, the following vehicle 300 was travelling at the travelling speed $V_{back}$, and the own vehicle 100 was travelling ahead of the following vehicle 300 at a travelling speed $V_{slf}$ larger than the travelling speed $V_{back}$. The preceding vehicle 200 decelerates based on the preceding vehicle travelling speed pattern $V_{fore-ptn}$ as indicated with the dotted line.

As shown in the lower portion of FIG. 12, the own vehicle 100 decelerates during a period from the previous time $t_{now}-1$ to the current time $t_{now}$. On the other hand, the following vehicle 300 also decelerates and having the same behavior as that of the own vehicle 100. At this time, the own vehicle 100 and the following vehicle 300 are in the similar state taking an energy reduction into consideration because of the following reason. Generally, when the driving characteristics are different between the own vehicle 100 and the following vehicle 300, the following vehicle 300 does not behave like the own vehicle 100. In this case, the intervehicle distance between the own vehicle 100 and the following vehicle 300 is shortened. However, in the example shown in FIG. 12, the intervehicle distance between the following vehicle 300 and the own vehicle 100 is not shortened between the previous time $t_{now}-1$ and the current time $t_{now}$.

Therefore, the driving characteristics of both vehicles 100 and 300 are the same. Even when the own vehicle 100 pays less attention to the following vehicle 300, travelling of the own vehicle 100 is unlikely to disturb the travelling of the following vehicle 300. In this case, when calculating the compatibility index $C_{back}$ with the above-equation (6), relatively small amount of value will be obtained. Accordingly, as shown in the lower portion of FIG. 12, the own vehicle 100 executes the coasting control based on the own vehicle travelling speed pattern $V_{slf-cst}$, whereby energy efficiency of the own vehicle 100 is improved, and compatibility with the following vehicle 300 can be prevented from decreasing.

In the upper portion of FIG. 13 illustrates a travelling situation of the following vehicle 300, the own vehicle 100 and the preceding vehicle 200 at the previous time $t_{now}-1$, and the lower portion of FIG. 13 illustrates a travelling situation of the following vehicle 300, the own vehicle 100 and the preceding vehicle 200 at the current time $t_{now}$. Since the example shown in the upper portion of FIG. 13 is the same as the example shown in FIG. 12, detailed explanation will be omitted.

As shown in the lower portion of FIG. 13, the own vehicle 100 decelerates from the previous time $t_{now}-1$ to $t_{now}$. On the other hand, the following vehicle 300 travels maintaining the travelling speed $V_{back}$, and the following vehicle 300 does not follow the behavior of the own vehicle 100. Hence, the own vehicle 100 and the following vehicle 300 are not in the similar state taking an energy reduction into consideration. Therefore, the own vehicle 100 possibly disturbs smooth travelling of the following vehicle 300 depending on the travelling state of the own vehicle 100, if the own vehicle 100 pays insufficient attention to the following vehicle 300. In this case, when calculating the compatibility index $C_{back}$ using the above equation (6), a relatively large value will be obtained. In this case, as shown in the lower portion of FIG. 13, the own vehicle 100 executes the ACC control based on the own vehicle travelling speed patter $V_{slf-acc}$, thereby suppressing a decrease in the compatibility with the following vehicle 300.

In the above-described equation (6), the compatibility index $C_{back}$ is calculated based on the trackability of the following vehicle 300 relative to the own vehicle 100 at the previous time $t_{now}-1$ and the current time $t_{now}$. Hence, in the case where the following vehicle 200 does not behave like the travelling state of the own vehicle 100, the own vehicle 100 need to pay more attention to the following vehicle 300.

Figure 7:
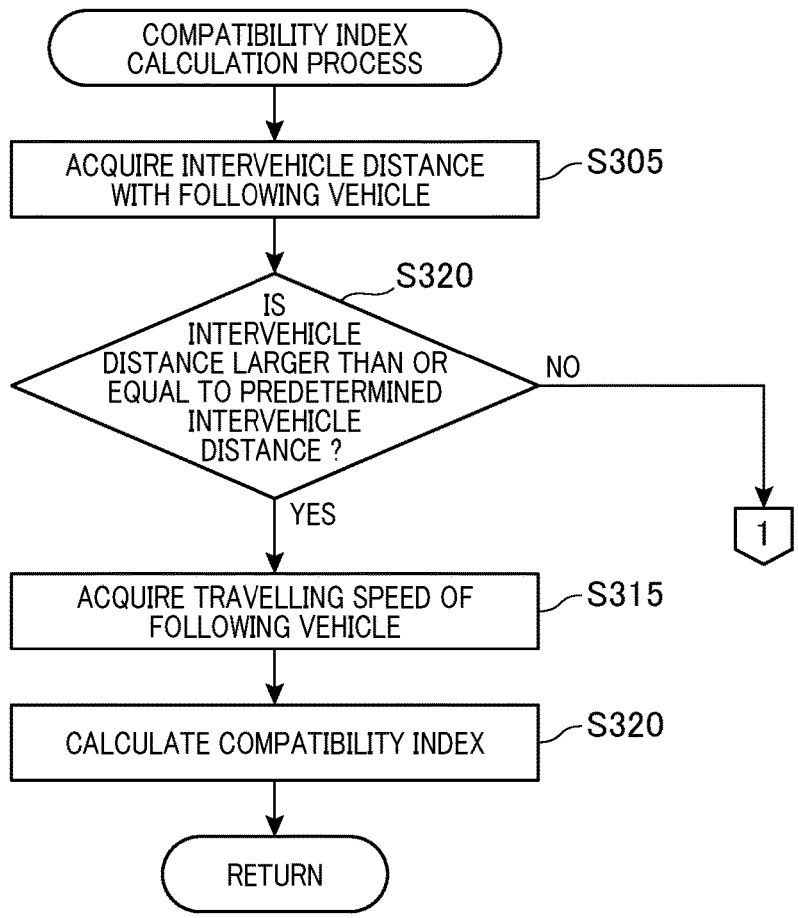
FIG. 7 is a flowchart showing a compatibility index calculation process.

As shown in FIG. 7, after executing the process at step S320, the compatibility index calculation process is terminated. The process shown in FIG. 7 is repeatedly executed whereby the control unit 21 is able to receive the compatibility index $C_{back}$ with the following vehicle 300 from the compatibility index as needed.

The coasting determination index calculated by the control unit 21 at step S130 shown in FIG. 2 is obtained with the following equation (7).

$$Flg_{cst}=f_{cst}(A_{acc}, A_{cst}, B_{acc}, B_{cst}, C_{back}) \quad (7)$$

In the above equation (7), $Flg_{cst}$ represents a coasting determination index. The equation (7) can be expressed with the following equation (8).

$$Flg_{cst}=f_{cst}(C_{ene}, C_{drb}, C_{back}) \quad (8)$$

As shown in the equation (7) and (8), the coasting determination index $Flg_{cst}$ can be obtained by calculating each of the index values $C_{ene}$, $C_{drb}$, $C_{back}$ and performing a predetermined calculation such as sum or product. According to the present embodiment, as the coasting index $Flg_{cst}$, 0 or 1 is obtained.

The control unit 21 performs a coasting travel determination at step S135 shown in FIG. 2 as follows. When the coasting determination index $Flg_{cst}$ calculated based on the above equation (8) is 1, the control unit 21 determines to execute the coasting control (step S135: YES). In this case, the ACC-ECU 73 stops the engine 81 and the clutch 82 cutoffs the torque transmission between the engine 81 and the mechanical connection shaft 84, whereby the own vehicle 100 travels by coasting. As a result, the energy efficiency of the own vehicle 100 is improved and the fuel efficiency of the own vehicle 100 is improved.

On the other hand, when the coasting determination index $Flg_{cst}$ is zero, the control unit 21 determines not to execute the coasting control (step S135: NO). In this case, the ACC-ECU 73 maintains the intervehicle distance with the preceding vehicle 200 to be constant and controls the own vehicle 100 to travel at the travelling speed which has been set, whereby the own vehicle 100 travels as the ACC travelling.

Since the travelling control apparatus 10 of the first embodiment having the above-described configurations determines whether to execute a coasting travel in accordance with the energy index $C_{ene}$ indicating a degree of improvement of the energy efficiency and the compatibility index $C_{back}$ indicating a degree of compatibility between the own vehicle 100 and the following vehicle 300, the energy efficiency of the own vehicle 100 can be improved while suppressing a decrease in the compatibility with the following vehicle 300.

Second Embodiment

Figure 14:
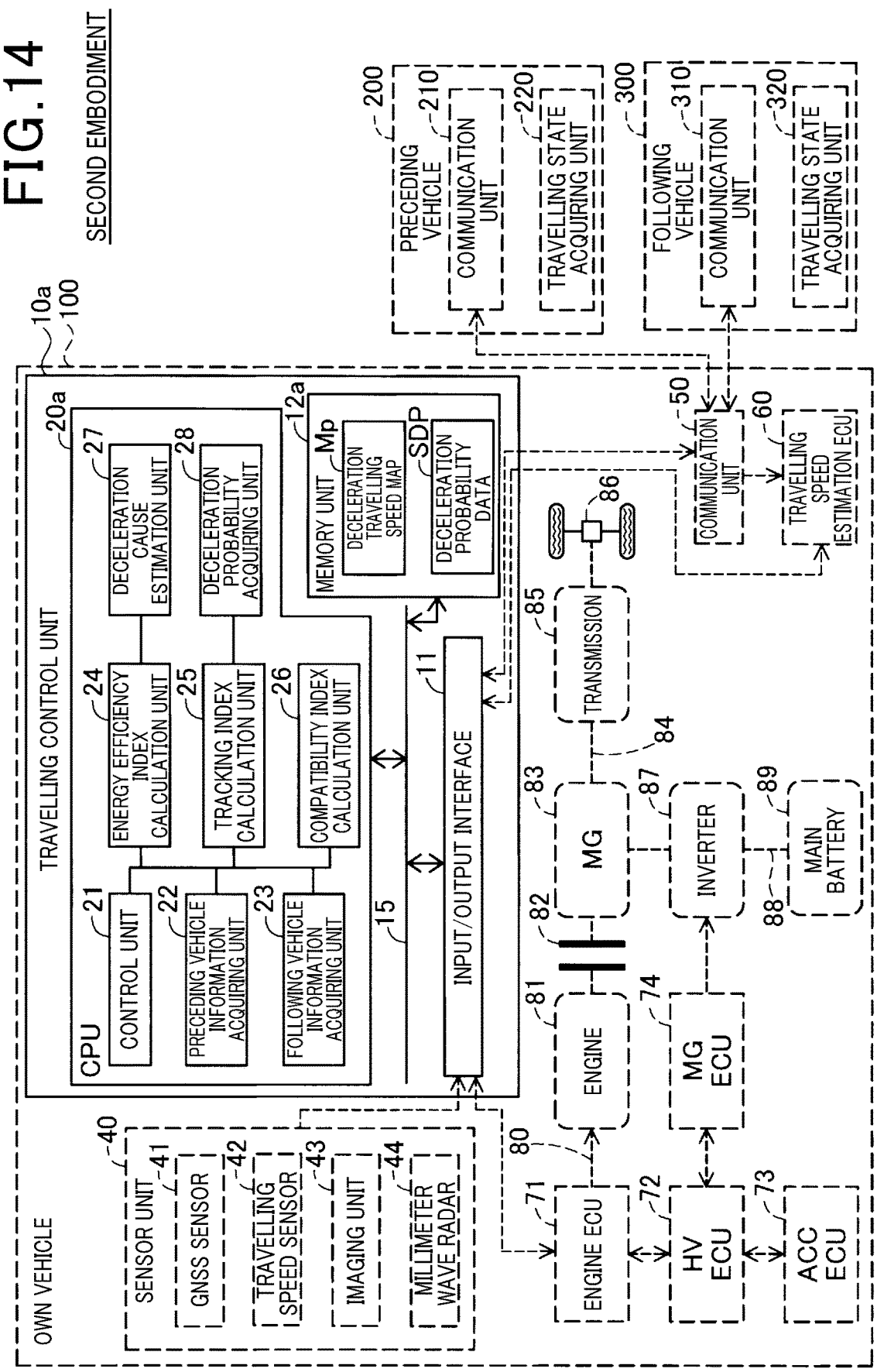
FIG. 14 is a block diagram showing an overall configuration of a travelling control apparatus according to a second embodiment.

A travelling control apparatus 10a according to the second embodiment shown in FIG. 14 differs from the travelling control apparatus according to the first embodiment shown in FIG. 1 in that a CPU 20a is provided instead of the CPU 20, and a memory 12a is provided instead of the memory 12. Since other configurations in the travelling control apparatus 10a according to the second embodiment are the same as those in the travelling control apparatus 10 according to the first embodiment, the same reference numbers are applied to the same elements and detailed explanations will be omitted.

The CPU 20a is provided with a deceleration probability acquiring unit 28 in addition to respective portions 21 to 27 included in the CPU 20 of the first embodiment. The deceleration probability acquiring unit 28 acquires a deceleration probability of the preceding vehicle 200 from a deceleration probability data SDP. The deceleration probability is an index that determines whether the vehicle decelerates or not, and is statistically derived for an intersection and each traffic lane such as an exit ramp of the highway. For example, the deceleration probability is set to be larger in a travelling road having relatively large curvature. Also, the deceleration probability is set to be larger in a travelling road having relatively large slope. Hence, it can be estimated that the larger the deceleration probability, the more the vehicle decelerates.

The memory 12a stores a deceleration probability data SDP. In the deceleration probability data SDP, a node and a link representing a configuration of a road on the map data, and the deceleration probability are correlated. The node refers to an element on the traffic path such as an intersection, a branch point, an end point, and a start point. The link refers to a line which connects between nodes such as a drive way and a footwalk. In the deceleration probability data SDP, in addition to the deceleration probability, a deceleration factor when the vehicle makes right or left turn in an intersection may be provided to be correlated thereto. Note that the deceleration probability data SDP is not necessarily stored in the memory 12a, but may be stored in a cloud server in the cloud computing system. According to this configuration, the deceleration probability acquiring unit 28 may acquire the deceleration probability data SDP via the communication unit 50.

A travelling control process according to the second embodiment, content of the process at step S114 shown in FIG. 2 is different from the first embodiment, and other contents of process are the same as those in the first embodiment.

Figure 15:
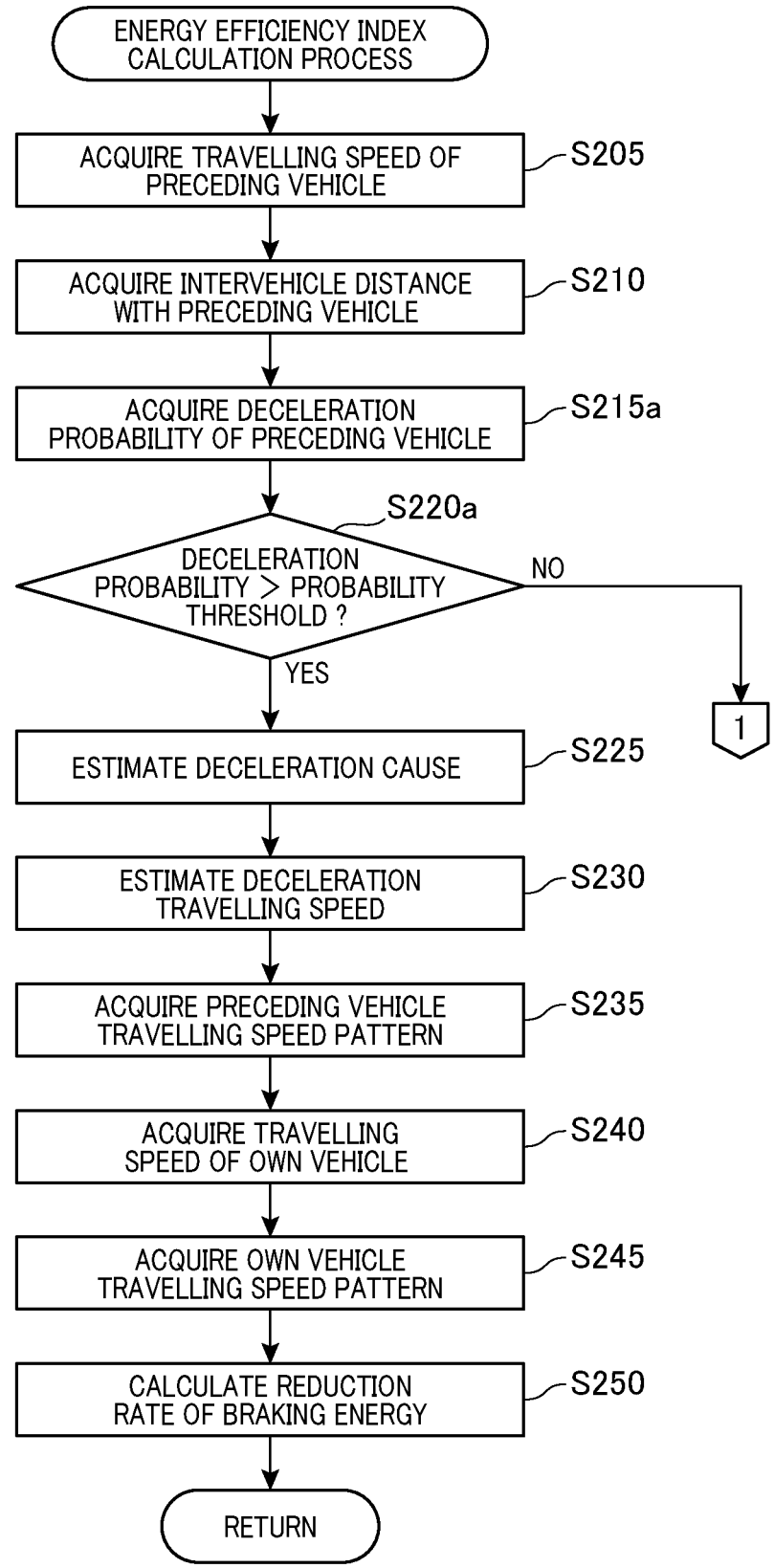
FIG. 15 is a flowchart showing an energy efficiency index calculation process according to the second embodiment.

As shown in FIG. 15, the energy efficiency index calculation process according to the second embodiment is different from that of the first embodiment shown in FIG. 3 such that step S215a is executed instead of step S215, and step S220a is executed instead of step S220. Since other processes in the energy efficiency index calculation process of the second embodiment are the same as those of the energy efficiency index calculation process of the first embodiment, the same reference numbers are applied to the same processes and the detailed explanation will be omitted.

According to the energy efficiency index calculation process of the first embodiment, information about the travelling state and the travelling environment of the preceding vehicle is utilized to determine whether the preceding vehicle decelerate. However, according to the energy efficiency index calculation process of the second embodiment, the deceleration probability of the preceding vehicle 200 is utilized to determine whether the preceding vehicle 200 decelerates. The deceleration probability is utilized to determine whether the preceding vehicle 200 decelerates because of the following reason. When assuming that the estimation whether the preceding vehicle decelerates is missed, the own vehicle 100 may excessively approach the preceding vehicle 200. At this time, when the own vehicle performs the ACC control to rapidly decelerate, a passenger in the own vehicle possibly feels discomfort. Also, the following vehicle 300 travels tracking the own vehicle 100 as a preceding vehicle. Hence, when estimating that the preceding vehicle 200 decelerates, it can be estimated that the own vehicle 100 decelerates, and then the following vehicle 300 decelerates too. Here, when assuming that estimation whether the preceding vehicle 200 decelerates is missed, the own vehicle 100 does not decelerate and the following vehicle 300 excessively approaches the own vehicle 100, thereby possibly causing discomfort to the passenger in the following vehicle 300. As a result, the compatibility between the own vehicle 100 and the following vehicle 300 may be decreased.

In this regard, according to the present embodiment, the preceding vehicle 200 is determined whether to decelerate or not by using the deceleration probability of the preceding vehicle 200. Accordingly, degradation ride comfort of the own vehicle 100 is suppressed and the passenger of the own vehicle 100 can be prevented from feeling discomfort, and a decrease in the compatibility between the own vehicle 100 and the following vehicle 300 can be suppressed.

As shown in FIG. 15, when the energy efficiency index calculation unit 24 acquires the front intervehicle distance from the preceding vehicle information acquiring unit 22 (step S210), the energy efficiency index calculation unit 24 acquires the deceleration probability of the preceding vehicle 200 from the deceleration probability acquiring unit 28 (step S215*a*). The deceleration probability acquiring unit 28 identifies the current location of the preceding vehicle 200 based on the detection result of the millimeter wave radar 44, identifies a location corresponding to the current location of the preceding vehicle 200 on the map data of the deceleration probability data SDP to acquire the deceleration probability correlated to the road (node, link) of which the location is identified. Then, the deceleration probability acquiring unit 28 outputs the acquired deceleration probability to the energy efficiency index calculation unit 24.

The energy efficiency index calculation unit 24 determines whether the acquired deceleration probability is larger than or equal to a probability threshold (step S220*a*). Specifically, the energy efficiency index calculation unit 24 determines that the preceding vehicle 200 decelerates when determined that the deceleration probability is larger than a predetermined probability threshold. On the other hand, when the deceleration probability is less than or equal to the predetermined probability threshold, the energy efficiency index calculation unit 24 determines that the preceding vehicle does not decelerate. According to the present embodiment, the predetermined probability threshold is set to 60%. Note that the predetermined probability threshold may be set to any value instead of using 60%.

In the above-described step S220*a*, when determined that the acquired deceleration probability is larger the predetermined probability threshold (step S220*a*: YES), that is, when determines that the preceding vehicle 200 decelerates, the above-described step S225 is executed. On the other hand, when determined that the acquired deceleration threshold is smaller than or equal to a predetermined probability threshold (step S220*a*: NO), that is, when determined that the preceding vehicle 200 does not decelerate, the energy efficiency index calculation process is terminated. As shown in FIG. 2, the control unit 21 terminates the travelling control process without executing the above-described steps S120 to S145.

According to the travelling control apparatus 10*a* of the second embodiment having the above-described configuration, the same effects as the first embodiment can be obtained.

Third Embodiment

A travelling control apparatus 10*a* according to the third embodiment is the same as the travelling control apparatus 10*a* of the second embodiment shown in FIG. 14. Hence, detailed explanation thereof will be omitted.

A travelling control process according to the third embodiment is different from the second embodiment such that contents of the process at step S115 shown in step S115 differs from that of the second embodiment. Other processes are the same as those in the second embodiment.

Figure 16:
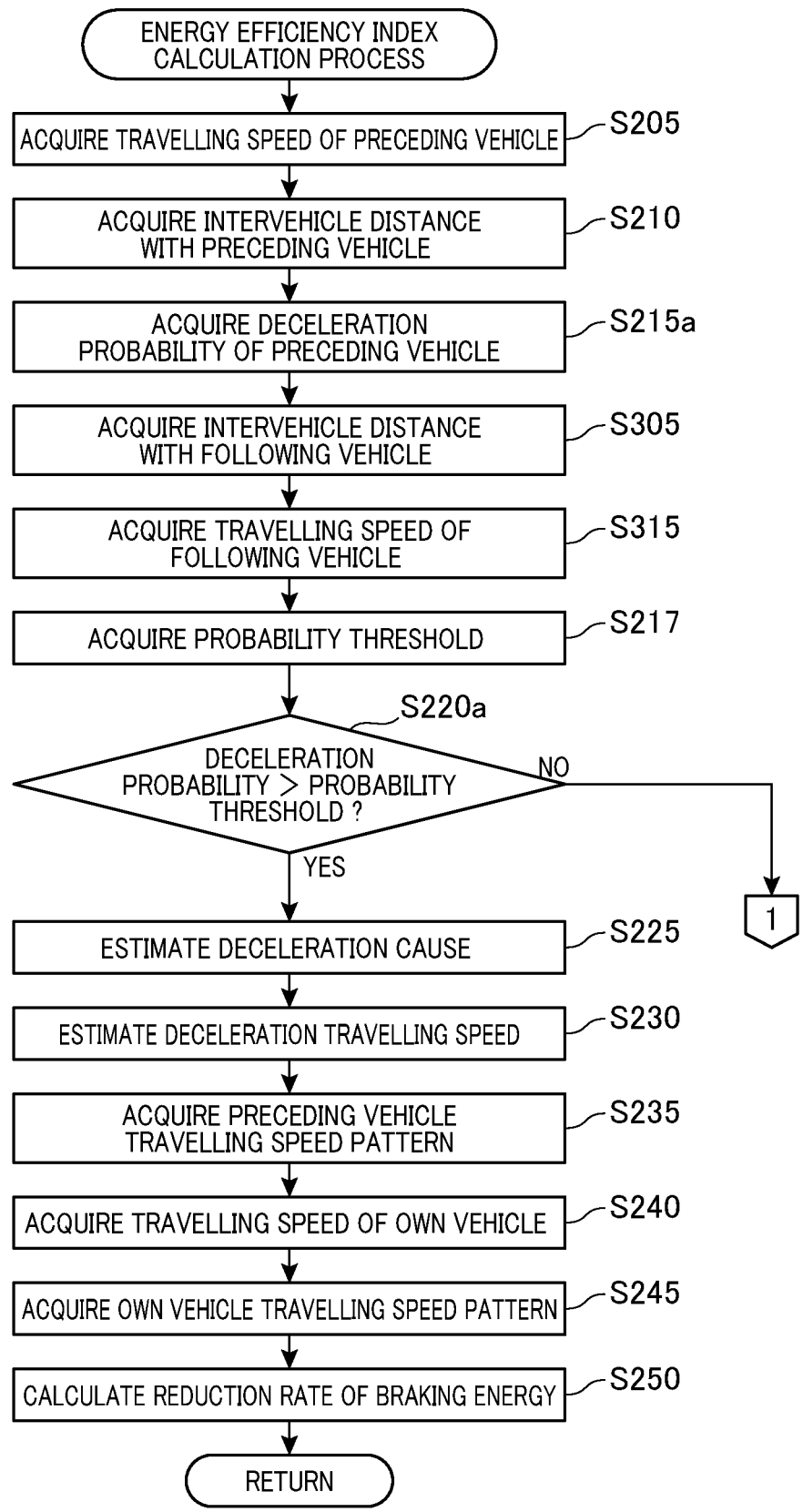
FIG. 16 is a flowchart showing an energy efficiency index calculation process according to a third embodiment.

As shown in FIG. 16, according to an energy efficiency index calculation process of the third embodiment, processes of steps S301, S314, S217 are added to the processes of the energy efficiency index calculation process of the second embodiment shown in FIG. 15. Since other processes of the energy efficiency index calculation process according to the third embodiment are the same as those in the second embodiment, the same reference numbers are applied to the same processes and detailed explanation thereof will be omitted.

According to the energy efficiency index calculation process of the second embodiment, the probability threshold is set in advance to be a predetermined fixed value (e.g. 60%). However, according to the energy efficiency index calculation process of the third embodiment, the travelling speed of the following vehicle 300 and the rear intervehicle distance which have been changing are utilized to calculate the probability threshold at every moment. This is because, determination whether the preceding vehicle 200 decelerates can be made while suppressing a decrease in the compatibility with the following vehicle 300. Hereinafter, this process will be described in more detail.

As shown in FIG. 16, the energy efficiency index calculation unit 24 acquires the deceleration probability of the preceding vehicle 200 from the deceleration probability acquiring unit 28 (step S215*a*). Then, the energy efficiency index calculation unit 24 executes step S305 and step S315 in the compatibility index calculation process shown in FIG. 7 to acquire the rear intervehicle distance and the travelling speed of the following vehicle 300 from the following vehicle information acquiring unit 23.

The energy efficiency index calculation unit 24 acquires the probability threshold from the deceleration probability acquiring unit 28 (step S217). Specifically, the energy efficiency index calculation unit 24 outputs the rear intervehicle distance and the travelling speed of the following vehicle 300 to the deceleration probability acquiring unit 28. The deceleration probability acquiring unit 28 calculates the probability threshold such that the smaller the rear intervehicle distance, the larger the probability threshold is. Alternatively, the deceleration probability acquiring unit 28 calculates the probability threshold such that the larger the travelling speed of the following vehicle 300, the larger the probability threshold is.

Thus, the reason why the probability threshold is calculated to be larger depending on the rear intervehicle distance and the travelling speed of the following vehicle 300 is as follows. For example, when determined that the preceding vehicle 200 decelerates at the above-described step S220, the own vehicle 100 may change the state to be in the coasting control to start deceleration prior to the preceding vehicle 200. At this time, assuming that the estimation of whether the preceding vehicle 200 decelerates or not is missed and the preceding vehicle 200 does not decelerate, it is considered that the own vehicle 100 starts to decelerate in order to suppress a decrease in the trackability to the preceding vehicle 200. In this case, the passenger of the own vehicle 100 may feel discomfort and the compatibility with the following vehicle 300 may decrease depending on the behavior of the own vehicle 100. Hence, according to the present embodiment, the probability threshold is set to be larger depending on the rear intervehicle distance and the travelling speed of the following vehicle 300. Note that the probability threshold calculated at step S217 corresponds to a first threshold of the present disclosure.

The deceleration probability acquiring unit 28 outputs the calculated probability threshold to the energy efficiency index calculation unit 24. Thereafter, the energy efficiency index calculation unit 24 executes the above-described step S220a and determines whether the probability threshold is larger than the calculated probability threshold.

According to the travelling control apparatus 10a of the third embodiment having the above-described configuration, the same effects as the second embodiment can be obtained. Moreover, since the probability threshold is set such that the smaller the rear intervehicle distance, the larger the probability threshold is, determination whether the preceding vehicle 200 decelerates can be accurately done, and misestimation of whether the preceding vehicle 200 decelerate can be suppressed. As a result, degradation of comfortable ride on the own vehicle 100 is suppressed and the passenger of the own vehicle 100 can be prevented from feeling discomfort.

Fourth Embodiment

Figure 17:
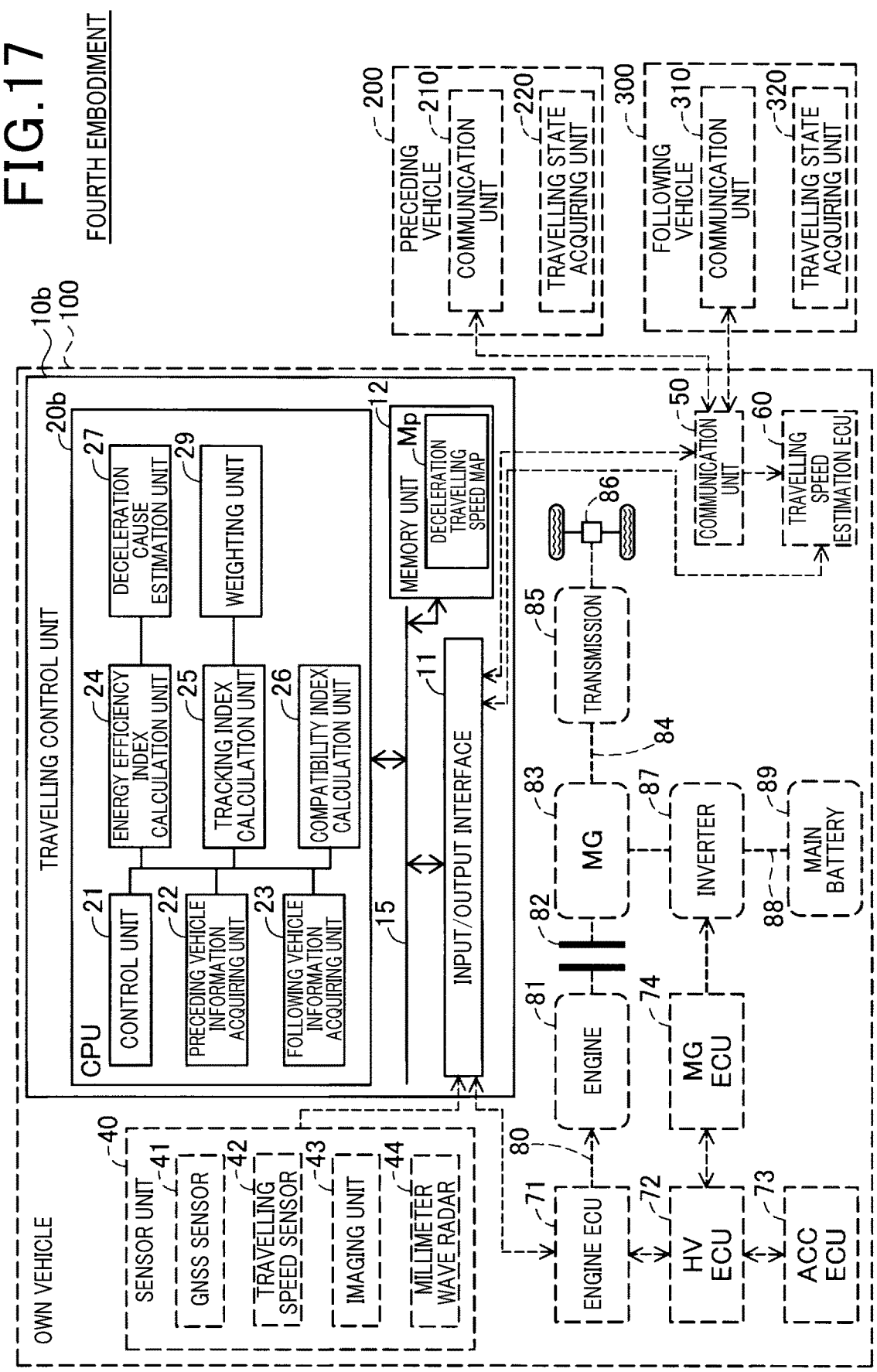
FIG. 17 is a block diagram showing an overall configuration of a travelling control apparatus according to a fourth embodiment.

A traveling control apparatus 10b of the forth embodiment shown in FIG. 17 differs from that of the first embodiment shown in FIG. 1 in that the travelling control apparatus 10b of the fourth embodiment includes CPU 20b instead of CPU 20. Since other configurations in the travelling control apparatus 10b according to the fourth embodiment are the same as those in the travelling control apparatus 10 according to the first embodiment, the same reference numbers are applied to the same elements and detailed explanations will be omitted.

The CPU 20b is provided with a weighting unit 29 in addition to respective portions 21 to 27 included in the CPU 20 of the first embodiment. The weighting unit 29 sets weight for respective indexes such as the energy efficiency index, the tracking index, and the compatibility index, based on a predetermined condition which will be described later.

According to the fourth embodiment, procedure of the travelling control process is different from that of the first embodiment. The processes of the energy efficiency index calculation process and the compatibility index calculation process are the same as those in the first embodiment.

Figure 18:
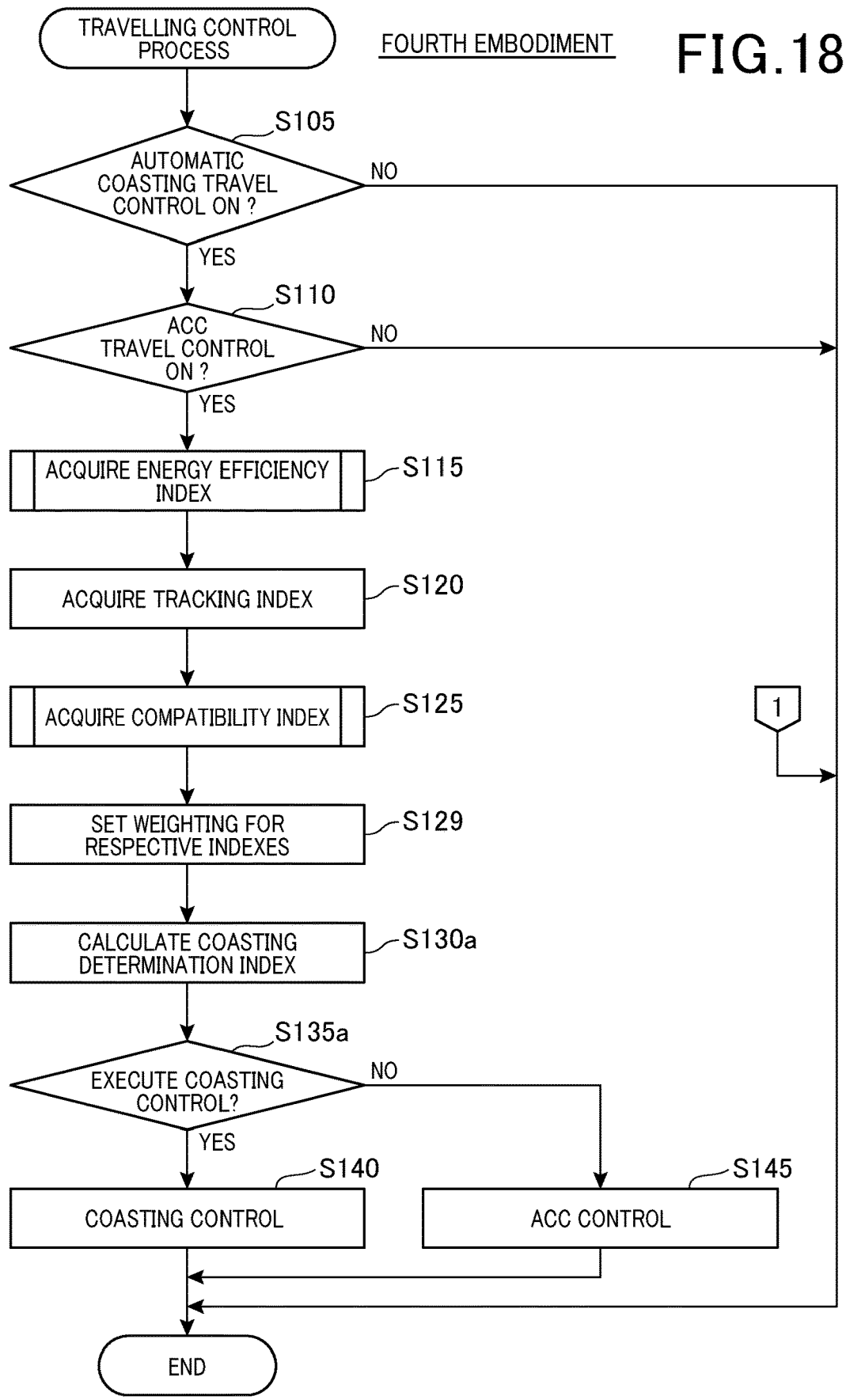
FIG. 18 is a flowchart showing a travelling control process according to the fourth embodiment.

As shown in FIG. 18, according to a travelling control process of the fourth embodiment, a process of step S129 is added, a process of step S130a is executed instead of executing the process of step S130, and a process of step S135a is executed instead of executing the process of step S135, compared to the travelling control process of the first embodiment shown in FIG. 2. Since other processes of the travelling control process according to the fourth embodiment are the same as those in the first embodiment, the same reference numbers are applied to the same processes and detailed explanation thereof will be omitted.

In the travelling control process according to the fourth embodiment, the process applies predetermined weighting to the indexes calculated by respective index calculation units 24, 25, 26, and calculates the coasting determination index by using the weighted indexes. Specifically, when the energy efficiency index is acquired (step S115), the tracking index is acquired (step S120), and the compatibility index (step S125) is acquired, the control unit 21 makes the weighting unit 29 apply weighting to the respective indexes (step S129).

When prioritizing the energy efficiency of the own vehicle 100, the weighting of the energy efficiency index is set to be larger than the weighting of the tracking index and the compatibility index. For example, the weighting of the energy efficiency index may be set to 0.5, the weighting of the tracking index may be set to 0.4 and the weighting of the compatibility index may be set to 0.1.

When prioritizing the trackability of the preceding vehicle 200, the weighting of the tracking index is set to be larger than the weighting of the energy efficiency index and the compatibility index. For example, the weighting of the energy efficiency index is set to 0.1, the weighting of the tracking index may be set to 0.7, and the weighting of the compatibility index may be set to 0.2.

When prioritizing the compatibility with the following vehicle 300, the weighting of the compatibility index is set to be larger than the weighting of the energy efficiency index and the tracking index. For example, the weighting of the energy efficiency index is set to 0.3, the weighting of the tracking index may be set to 0.1, and the weighting of the compatibility index may be set to 0.6.

Thus, weighting value may be arbitrarily set to respective indexes depending on the priority among the energy efficiency of the own vehicle 100, the trackability of the preceding vehicle 200 and the compatibility with the following vehicle 300. Even in the case where respective index values acquired at the above-described steps 120 to 125 are the same value, the travelling behavior of the own vehicle 100 can be changed by setting the weighting.

The control unit 21 calculates the coasting determination index (step S130a). Specifically, the control unit 21 calculates, based on the following equation (9), a total value of respective index values $C_{ene}$, $C_{drb}$, and $C_{back}$ which have been weighted.

$$C_{total} = w_{ene} \cdot C_{ene} + w_{drb} \cdot C_{drb} + w_{back} \cdot C_{back} \qquad (9)$$

In the above-equation (9), C is the index value, $C_{ene}$ is the energy efficiency index of the own vehicle 100, $C_{drb}$ is the tracking index of the preceding vehicle 200, and the $C_{back}$ is the compatibility index with the following vehicle 300. w is weighting value, $w_{ene}$ is the weighting value of the energy efficiency index, $w_{drb}$ is the weighting value of the tracking index, and $w_{back}$ is weighting value of the compatibility index. $C_{total}$ is total value of respective indexes to which weighting values are added (hereinafter referred to as weighted index total).

Here, the energy efficiency index $C_{ene}$ indicates that the smaller the value, the higher the energy efficiency is. The tracking index $C_{drb}$ indicates that the smaller the value, the higher the trackability of the preceding vehicle 200 is. The compatibility index $C_{back}$ indicates that the smaller the value, the more the behavior of the following vehicle 300 is followed, so that the compatibility with the following vehicle 300 is high. Therefore, in the above-described equation (9), the weighted index total $C_{total}$ indicates that the smaller the value, the better balance of the indexes are present. Note that the weighted total index C total is not necessarily the total of the respective indexes which have been weighted, but may be a product of the respective indexes which have been weighted, or may be calculated in some other way.

Thereafter, the control unit 21 calculates the coasting determination index based on the following equations (10-1) and (10-2).

$$Flg_{cst}(C_{total} \leq Flg_{th\text{-}slf\text{-}back}) \qquad (10\text{-}1)$$

$$Flg_{cst}=0 \ (C_{total}>Flg_{th\text{-}slf\text{-}back}) \qquad (10\text{-}2)$$

In the above-described equations (10-1) and (10-2), $Flg_{cst}$ is coasting determination index. $Flg_{th\text{-}slf\text{-}back}$ is a threshold. According to the present embodiment, the threshold $Flg_{th\text{-}slf\text{-}back}$ is set to 0.5. Note that the threshold $Flg_{th\text{-}slf\text{-}back}$ may be set to any value in a range from 0 to 1, instead of 0.5.

The above-described equations (7) and (8) in the first embodiment can be expressed by the following equation (11) taking respective weighting values $w_{ene}$, $w_{drb}$, $w_{back}$ into consideration.

$$Flg_{cst}=f_{cst}(A_{acc},A_{cst},B_{acc},B_{cst},C_{back},w_{ene},w_{drb},w_{back},\\Flg_{th\text{-}slf\text{-}back}) \qquad (11)$$

The equation (11) can be also expressed with the following equation (12).

$$Flg_{cst}=f_{cst}(C_{ene},C_{drb},C_{back},w_{ene},w_{drb},w_{back},Flg_{th\text{-}slf\text{-}back}) \qquad (12)$$

As indicated in the equations (11) and (12), the braking energy $A_{acc}$ and $A_{cst}$ are used to calculate the energy efficiency index $C_{ene}$, and the average value $B_{acc}$ and $B_{cst}$ of the intervehicle time are used to calculate the tracking index $C_{drb}$, and the compatibility index $C_{back}$ is calculated based on the above-described equations (4), (5) and (6). Then, predetermined weighting values $w_{ene}$, $w_{drb}$ and $w_{back}$ are set for the calculated indexes $C_{ene}$, $C_{drb}$ and $C_{back}$. Further, a predetermined calculation such as sum or product is performed for the indexes in which the weighting values $w_{ene}$, $w_{drb}$ and $w_{back}$ are set, and the calculation result is compared with the threshold $Flg_{th\text{-}slf\text{-}back}$, whereby the coasting determination index $Flg_{cst}$ is calculated.

As shown in FIG. 18, the control unit 21 performs a coasting travel determination by using the coasting determination index $Flg_{cst}$ (step S135a). Note that since the contents of process for the coasting travel determination is the same as that of the first embodiment, detailed explanation thereof will be omitted.

According to the travelling control apparatus 10c of the fourth embodiment having the above-described configuration, the same effects as the first embodiment is obtained. Moreover, the weighting unit 29 applies predetermined weighting values $w_{ene}$, $w_{drb}$ and $w_{back}$ to the calculated indexes $C_{ene}$, $C_{drb}$ and $C_{back}$. The control unit 21 calculates the coasting determination indexes $Flg_{cst}$ by using the weighted indexes, whereby the coasting determination index $Flg_{cst}$ is appropriately calculated depending on the travelling state or the like of the own vehicle 100, while appropriately maintaining the balance between the energy efficiency of the own vehicle 100, the trackability to the preceding vehicle 200 and the compatibility with the following vehicle 300.

Fifth Embodiment

Figure 19:
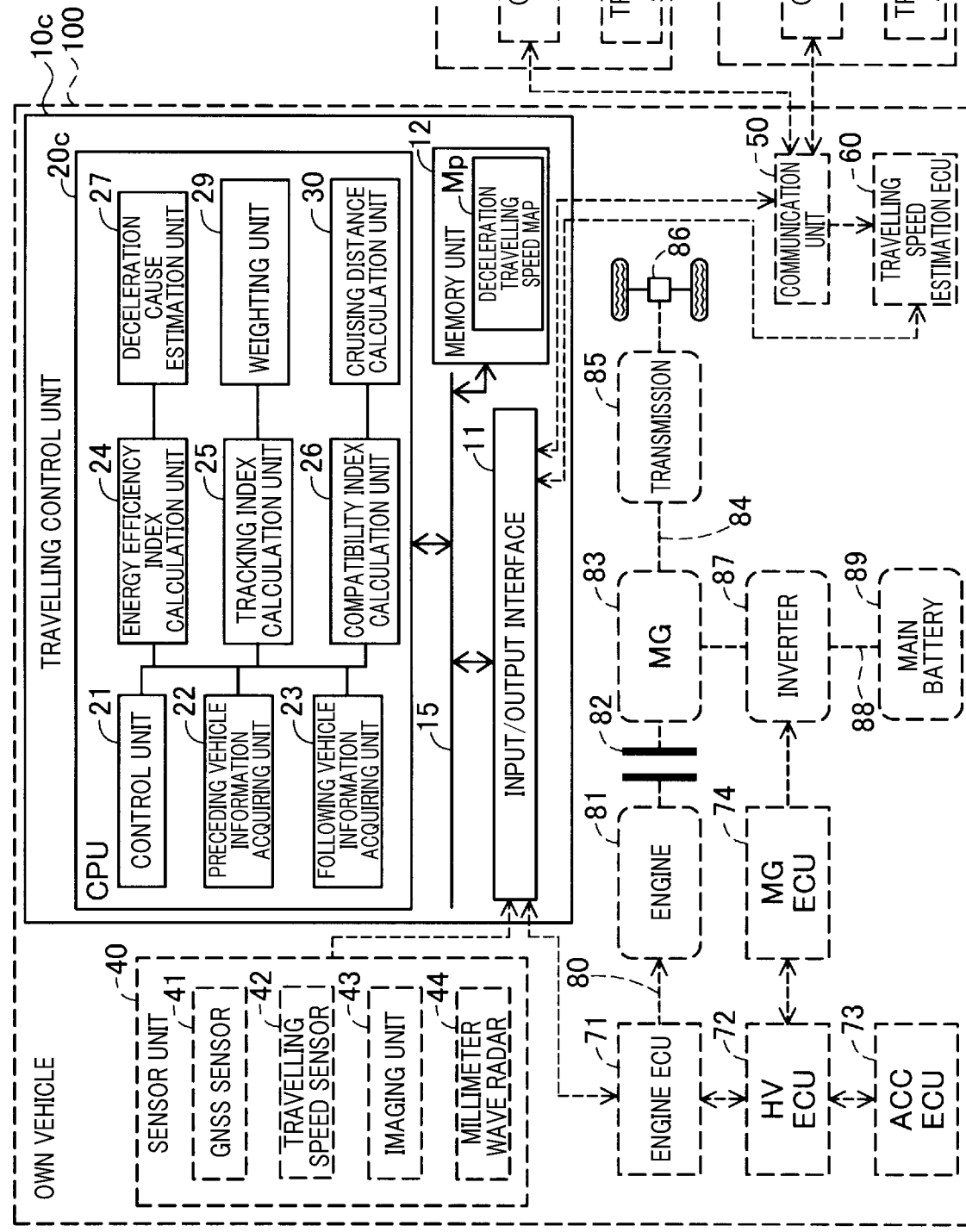
FIG. 19 is a block diagram showing an overall configuration of a travelling control apparatus according to a fifth embodiment.

A travelling control apparatus 10c according to the fifth embodiment shown in FIG. 19 differs from the travelling control apparatus 10b shown in FIG. 17 in that the CPU 20c is provided instead of the CPU 20b. Since other configurations in the travelling control apparatus 10c according to the fifth embodiment are the same as those in the travelling control apparatus 10b according to the fourth embodiment, the same reference numbers are applied to the same elements and detailed explanations will be omitted.

The CPU 20c is provided with a cruising distance calculation unit 30 in addition to the respective units 21 to 27 and 29 included in the CPU 20 of the first embodiment. The cruising distance calculation unit 30 utilizes an amount of remaining fuel or SOC of the main battery 89 to calculate the cruising distance of the own vehicle 100.

For the fifth embodiment, the travelling control process is different from that of the fourth embodiment. The processes of the energy efficiency index calculation process and the compatibility index calculation process are the same as those in the first embodiment.

Figure 20:
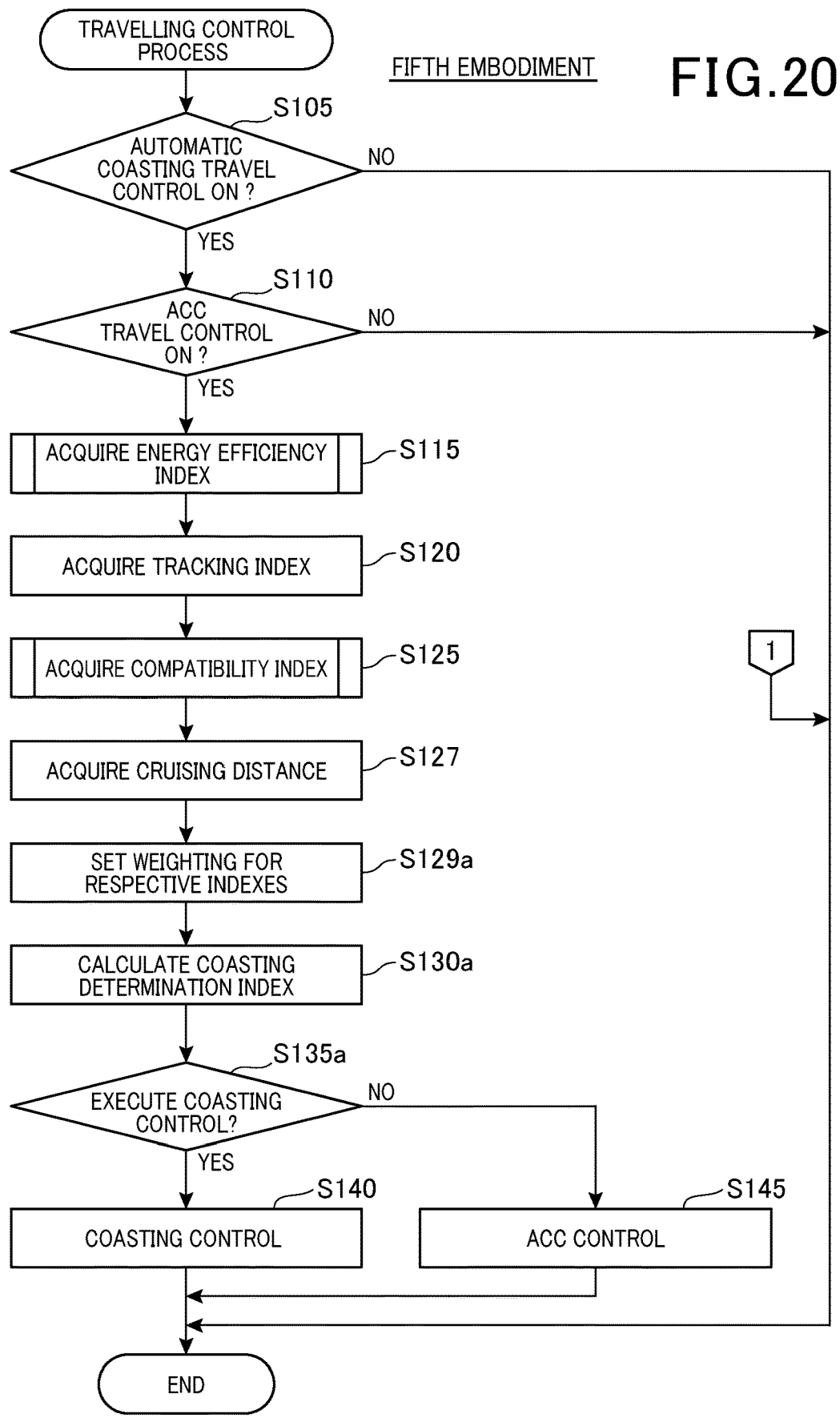
FIG. 20 is a flowchart showing a travelling control process according to the fifth embodiment.

As shown in FIG. 20, the travelling control process according to the fifth embodiment is different from the travelling control process according to the fourth embodiment shown in FIG. 19 such that step S127 is added/executed, and step S129a is executed instead of step S129. Since other processes of the travelling control process according to the fifth embodiment are the same as those in the fourth embodiment, the same reference numbers are applied to the same elements and detailed explanations will be omitted.

According to the travelling control process of the fifth embodiment, the weighting values $w_{ene}$, $w_{drb}$ and $w_{back}$ are set for the respective index values $C_{ene}$, $C_{drb}$ and $C_{back}$ depending on the cruising distance of the own vehicle 100. Specifically, the control unit 21 acquires the cruising distance of the own vehicle 100 from the cruising distance calculation unit 20 (step S127), when the energy efficiency index $C_{ene}$ (step S115), the tracking index $C_{drb}$ (step S120), and the compatibility index $C_{back}$ (step S125) are acquired.

The control unit 21 makes the weighting unit 29 set the weighting values $w_{ene}$, $w_{drb}$ and $w_{back}$ by using the acquired cruising distance for the respective index values $C_{ene}$, $C_{drb}$ and $C_{back}$ (step S129a). Specifically, the weighting unit 29 determines whether the cruising distance calculated at the above-described step S127 is smaller than a predetermined threshold. According to the present embodiment, a predetermined threshold is a predetermined value set in advance by the weighting unit 29, and used to determine step S129a, which refers to a travelling distance from the current location of the own vehicle 100 to the destination. The travelling distance from the current location of the own vehicle 100 to the destination can be acquired using a travelling route plan of the own vehicle set in the navigation apparatus (not shown) mounted on the own vehicle 100. Note that the predetermined threshold may be a travelling distance from the current location of the own vehicle 100 to a fuel supply station. According to the present embodiment, the fuel supply station refers to a gas station. The predetermined threshold corresponds to a second threshold of the present disclosure.

In the above-described step S129a, when the calculated cruising distance is smaller than the travelling distance from the current location of the own vehicle 100 to the destination, the weighting unit 29 sets the weighting value $w_{ene}$ of the energy efficiency index $C_{ene}$ to be larger than the weighting value $w_{drb}$ of the tracking index $C_{drb}$ and the weighting value $w_{back}$ of the compatibility index $C_{back}$. On the other hand, when the calculated cruising distance is larger than or equal to the travelling distance from the current location of the own vehicle 100 to the destination, the weighting unit 29 sets the weighting value $w_{ene}$ of the energy efficiency index $C_{ene}$ to be smaller than the weighting value $w_{drb}$ of the tracking index $C_{drb}$ and the weighting value $w_{back}$ of the compatibility index $C_{back}$. Thus, when the cruising distance is smaller than the travelling distance from the current location of the own vehicle 100 to the destination, the weighting value of the energy efficiency index of the own vehicle 100 is set prioritizing the trackability to the preceding vehicle 200 and the compatibility to the following vehicle 300. This is to suppress a risk that the own vehicle 100 cannot arrive the destination because of lack of fuel.

According to the travelling control apparatus 10b of the fifth embodiment having the above-described configurations, the same effects as the fourth embodiment can be obtained. Further, since the weighting unit 29 sets the weighting value $w_{ene}$ of the energy efficiency index $C_{ene}$ to be larger than the weighting value $w_{drb}$ of the tracking index $C_{drb}$ and the weighting value $w_{back}$ of the compatibility index $C_{back}$, when the calculated cruising distance is smaller than the travelling distance from the current location of the own vehicle 100 to the destination, the energy efficiency of the own vehicle 100 can be improved compared to a case where the weighting value $w_{ene}$ of the energy efficiency index $C_{ene}$ is set to be smaller than the weighting value $w_{drb}$ of the tracking index $C_{drb}$ and the weighting value $w_{back}$ of the compatibility index $C_{back}$. The risk can be suppressed that the own vehicle 100 cannot arrive the destination because of lack of fuel.

Sixth Embodiment

A travelling control apparatus 10b according to the sixth embodiment is the same as the travelling control apparatus 10b of the fourth embodiment shown in FIG. 17. Hence, detailed explanation thereof will be omitted.

For the sixth embodiment, the travelling control process is different from that of the fourth embodiment. The processes of the energy efficiency index calculation process and the compatibility index calculation process are the same as those in the fourth embodiment.

Figure 21:
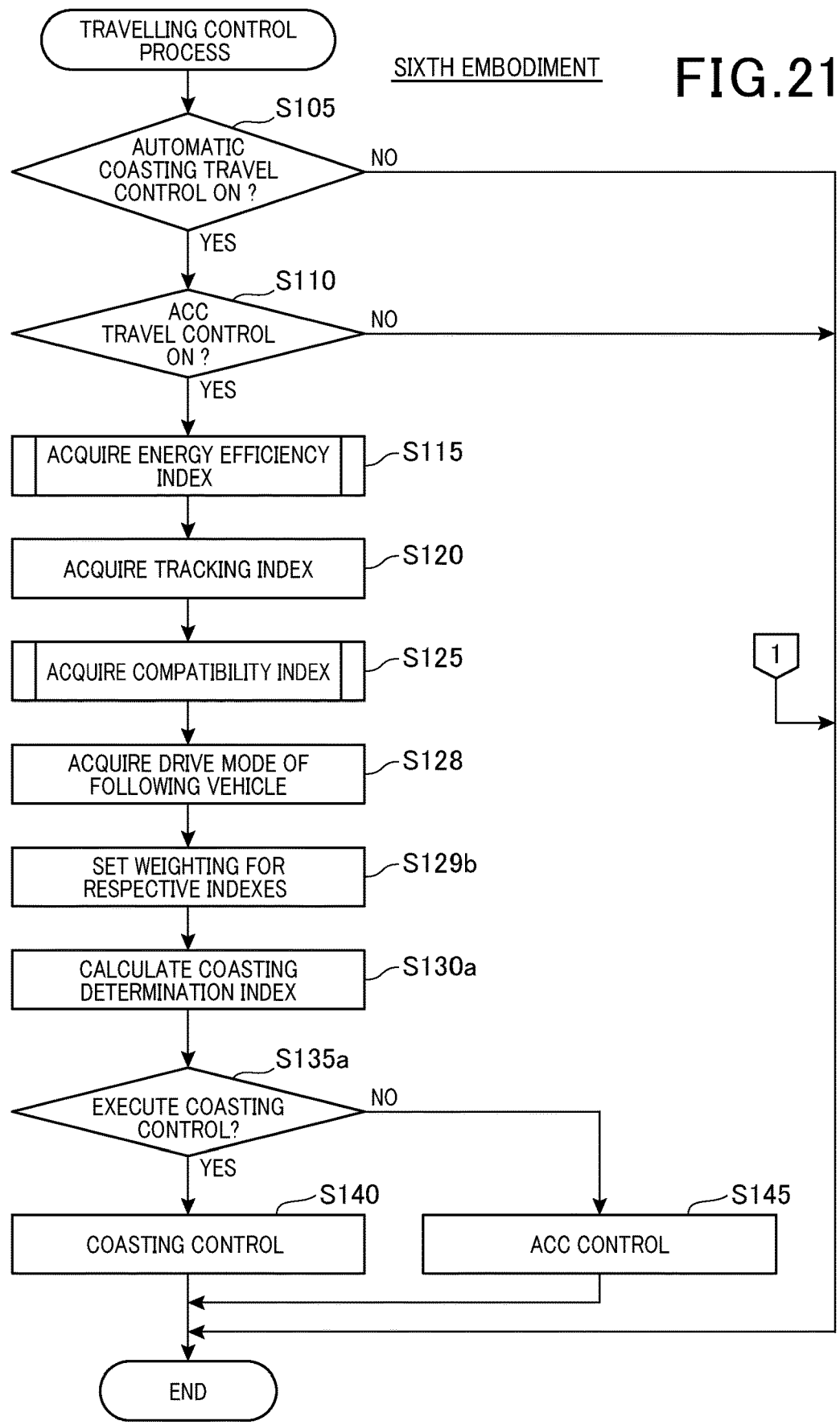
FIG. 21 is a flowchart showing a travelling control process according to a sixth embodiment.

As shown in FIG. 21, the travelling control process according to the sixth embodiment is different from the travelling control process according to the fourth embodiment shown in FIG. 18 such that step S128 is added/executed, and step S129a is executed instead of step S129. Since other processes of the travelling control process according to the sixth embodiment are the same as those in the fourth embodiment, the same reference numbers are applied to the same elements and detailed explanations will be omitted.

According to a traveling control process of the fourth embodiment, the weighting $w_{ene}$, $w_{drb}$ and $w_{back}$ are set for the respective index values $C_{ene}$, $C_{drb}$ and $C_{back}$ depending on a drive mode of the following vehicle 300. Specifically, when the process acquires the energy efficiency index $C_{ene}$ (step S115), the tracking index $C_{drb}$ (step S120), and the compatibility index $C_{back}$ is acquired (step S125), the control unit 21 acquires the drive mode of the following vehicle 300 from the following vehicle information acquiring unit 23 (step S128). According to the present embodiment, the drive mode refers to a mode representing a travelling state of the following vehicle 300, including an economy mode, a normal mode and a sport mode. Note that the control unit 21 may acquire the drive mode of the following vehicle 300 from the travelling situation acquiring unit 320.

The control unit 21 makes the weighting unit 29 set the weighting values $w_{ene}$, $w_{drb}$ and $w_{back}$ for the respective index values $C_{ene}$, $C_{drb}$ and $C_{back}$ depending on the drive mode of the following vehicle 300 (step S129a). Specifically, the process determines which drive mode does the acquired drive mode correspond to. For example, when the drive mode of the following vehicle 300 is the economy mode, the weighting unit 29 sets the weighting value $w_{ene}$ of the energy efficiency index $C_{ene}$ to be larger than the weighting value $w_{drb}$ of the tracking index $C_{drb}$ and the weighting value $w_{back}$ of the compatibility index $C_{back}$. According to this configuration, the own vehicle 100 pays less attention to the following vehicle 300 compared to a case where the own vehicle 100 prioritizes the energy efficiency. As a result, the energy efficiency of the own vehicle 100 can be improved while taking the compatibility with the following vehicle into consideration.

Also, when the own vehicle 100 is in the sport mode, the weighting unit 29 may set the weighting value $w_{back}$ of the energy efficiency index $C_{back}$ to be larger than the weighting value $w_{ene}$ of the energy efficiency index $C_{ene}$ and the weighting value $w_{drb}$ of the tracking index $C_{drb}$. According to the above-described travelling configuration, travelling of the following vehicle 300 can be significantly prevented from being disturbed by the travelling of the own vehicle 100. Moreover, the weighting value $w_{drb}$ of the tracking index $C_{drb}$ may be set to be larger than the weighting value $w_{ene}$ of the energy efficient index $C_{ene}$ and the weighting value $w_{back}$ of the compatibility index $C_{back}$.

Thereafter, the control unit 21 executes the above-described step S130a and calculates the coasting determination index $Flg_{cst}$ using the respective index values $C_{ene}$, $C_{drb}$, and $C_{back}$ which are weighted taking the drive mode of the following vehicle 300.

According to the travelling control apparatus 10b of the sixth embodiment having the above-described configuration, the same effects of the fourth embodiment can be obtained. Moreover, since the weighting unit 29 sets the weighting $w_{ene}$ of the energy index $C_{ene}$, when the drive mode of the following vehicle 300 acquired by the following vehicle information acquiring unit 23 is the economy mode, to be larger than the weighting value $w_{drb}$ of the tracking index $C_{drb}$ and the weighting value $w_{back}$ of the compatibility index $C_{back}$, the energy efficiency of the own vehicle 100 can be improved while taking the compatibility with the following vehicle into consideration. Further, when the acquired drive mode of the following vehicle 300 is the speed mode, the weighting value $w_{drb}$ of the tracking index $C_{drb}$ and the weighting value $w_{back}$ of the compatibility index $C_{back}$ is set to be larger than the weighting value $w_{ene}$ of the energy efficiency index $C_{ene}$, whereby travelling of the following vehicle 300 can be significantly prevented from being disturbed by the travelling of the own vehicle 100.

Seventh Embodiment

A travelling control apparatus 10 according to the seventh embodiment is the same as the travelling control apparatus 10 of the first embodiment shown in FIG. 1. Hence, detailed explanation thereof will be omitted.

For the seventh embodiment, the travelling control process is different from that of the first embodiment. The processes of the energy efficiency index calculation process and the compatibility index calculation process are the same as those in the first embodiment.

Figure 22:
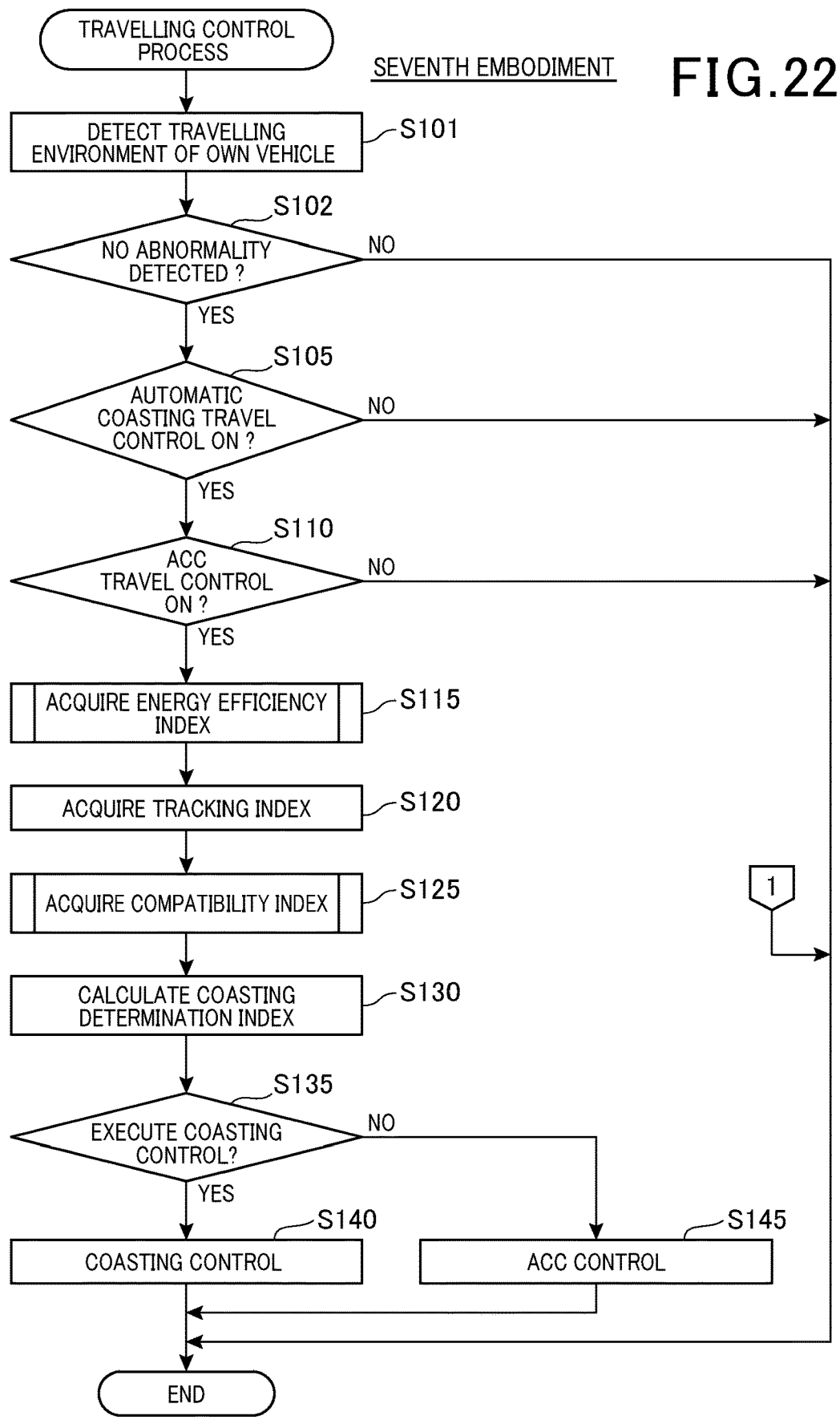
FIG. 22 is a flowchart showing a travelling control process according to a seventh embodiment.

As shown in FIG. 22, the travelling control process according to the seventh embodiment is different from the travelling control process according to the first embodiment shown in FIG. 2 such that steps S101 and S102 are added/executed. Since other processes of the travelling control process according to the seventh embodiment are the same as those in the first embodiment, the same reference numbers are applied to the same elements and detailed explanations will be omitted.

According to the travelling control process of the seventh embodiment, the process determines whether an abnormality has occulted in the travelling environment of the own vehicle 100. When detecting an abnormality, the process suspends an estimation whether the preceding vehicle decelerates, a calculation of respective index values and an execution of the coasting travel determination. For example, in the case where the road surface is in a wet condition due to snowfall or rainfall, or the case where the preceding vehicle 200 receives resistance due to strong wind, an estimation whether the preceding vehicle decelerates may not be performed accurately. Hence, according to the present embodiment, firstly, the process detects whether an abnormality has occurred in the travelling environment. Hereinafter, detailed explanation will be described.

Once the travelling control process is activated, the control unit 21 uses the detection result of the sensor unit 40 to detect the travelling environment of the own vehicle 100 (step S101). Specifically, the control unit 21 detects a frozen road surface or a puddle on the road surface from the imaging unit 43. For a configuration in which the rainfall sensor is mounted on the outside the vehicle cabin of the own vehicle 100, the control unit 21 may detect a state of the road surface depending on an amount of rainfall detected by the rainfall sensor. Further, for example, the control unit 21 may detect a weather forecast and a wind state at the current location of the own vehicle 1 via the communication unit 50 to detect the travelling environment.

The control unit 21 determines whether an abnormality has occurred or not (step S102). Specifically, the control unit 21 determines that an abnormality has occurred in the travelling environment when the road surface where the own vehicle travels is wet because of being covered with water or the like. The control unit 21 determines that an abnormality has occurred in the travelling environment when the wind speed at the current location of the own vehicle 100 is larger than or equal to a predetermined wind speed. When determined that an abnormality has occurred in the travel environment at step S102 (step S102: NO), the process terminates the travel control process. On the other hand, when determined that no abnormality has occurred in the travelling environment (step S102: YES), the process executes the above-described step S105.

According to the travelling control apparatus 10c having the above-described configuration, the same effects as the first embodiment can be obtained. Moreover, since the travelling control process is terminated when the process detects an abnormality in the travelling environment, the processing load required for calculating the index values or executing the coasting travel determination can be reduced. In the second embodiment or the sixth embodiment, the above-described steps S101 and S102 may be added.

Other Embodiments

In the above-described sixth embodiment, the weighting unit 29 may set the weighting depending on the ACC setting time of the following vehicle 300, instead of the drive mode of the following vehicle 200, or in addition to the drive mode of the following vehicle 300. According to this configuration, for example, the weighting value $w_{back}$ of the compatibility index value $C_{back}$ is set such that the longer the vehicle length of the following vehicle 300, the larger the weighting value $w_{back}$ is, compared to the weighting value $w_{ene}$ of the energy efficiency index $C_{ene}$ and the weighting value $w_{drb}$ of the tracking index $C_{drb}$. Further, for example, the weighting unit 29 may set the weighting depending on driving characteristics of the driver in the following vehicle 300. The driving characteristics refers to behavior or characteristics for driving the vehicle in accordance with driver's personality and experience. For example, the driving characteristics includes a way of pressing the gas pedal, and a way of keeping the intervehicle distance. According to the above-described configuration, in the case where the driver of the following vehicle 300 suddenly starts the vehicle or shortens the intervehicle distance to drive the vehicle to be significantly close to the preceding vehicle, the weighting value $w_{back}$ of the energy efficiency index $C_{back}$ may be set to be larger than the weighting value $w_{ene}$ of the energy efficiency index $C_{ene}$ and the weighting value $w_{drb}$ of the tracking index $C_{drb}$. Even in this configuration, the same effects as the sixth embodiment can be obtained.

According to the above-described sixth embodiment, the weighting unit 29 may set the weighting depending on the drive mode of the own vehicle 100 instead of the drive mode of the following vehicle 300. According to the above configuration, the weighting unit 29 may read the setting value of the drive mode specified by the driver of the own vehicle 100 to acquire the drive mode of the own vehicle 100, and may perform the similar weighting process to the above-described other embodiments. In such a configuration, similar effects to the above-described sixth embodiment and the other embodiments can be obtained.

According to the above-described respective embodiments, in the case where behavior of the following vehicle 300 is similar to that of the own vehicle 100 when calculating the compatibility index $C_{back}$ based on the above-described equation (6), the own vehicle 100 executes the coasting control. However, the ACC control may be executed in the case where an improvement of the energy efficiency of the own vehicle 100 cannot be expected when estimating that the preceding vehicle 200 will decelerate at a small deceleration factor because the difference between the target travelling speed $V_{fore-trg}$ after deceleration and the current travelling speed $V_{slf}$ is small. Also, the own vehicle 100 performs the ACC control in the case where behavior of the following vehicle 300 is not similar to that of the own vehicle 100. However, the coasting control may be executed in the case where an improvement of the energy efficiency of the own vehicle 100 can be expected when estimating that the preceding vehicle 200 will decelerate at a large deceleration factor because the difference between the target travelling speed $V_{fore-trg}$ after deceleration and the current travelling speed $V_{slf}$ is large. According to such a configuration, similar effects to the above-described respective embodiments can be obtained.

In the above-described respective embodiments, the weighting unit 29 may set the weighting depending on the deceleration cause α of the preceding vehicle 200. Specifically, when the deceleration cause α of the preceding vehicle 200 is set in advance as a predetermined cause, the weighting value $w_{ene}$ of the energy efficiency index $C_{ene}$ may be set to be larger than the weighting value $w_{drb}$ of the tracking index $C_{drb}$ and the weighting value $w_{back}$ of the compatibility index $C_{back}$. According to the present embodiment, the predetermined cause refers to any one of reasons of a traffic signal indicating red located at a predetermined distance (e.g. 300 meters) away from the current location of the preceding vehicle 200 in the travelling direction thereof, a cross walk located at a predetermined distance away from preceding vehicle in the traveling direction thereof, a road sign indicating a temporary stop, located at a predetermined distance away from the preceding vehicle in the travelling direction thereof, and a toll gate located at a predetermined distance away from the preceding vehicle in the travelling direction thereof.

In the case where the receding vehicle 200 decelerates because of the above-described predetermined deceleration cause, the passenger of the following vehicle 300 readily estimates that the preceding vehicle 200 and the own vehicle 100 will decelerate. Hence, prioritizing the energy efficiency of the own vehicle 100, effects of improving the energy efficiency can be readily obtained. For setting respective weighting values $w_{ene}$, $w_{drb}$ and $w_{back}$, it is not limited to the above-described setting method. However, prioritized index for each deceleration cause is set in advance, and a prioritized weighting value of the index may be set to be larger than weighting values of other indexes. Even with this configuration, the same effects as the above-described respective embodiments can be obtained.

In the respective embodiments, the compatibility index calculation unit 26 uses travelling speed difference between the traveling speed $V_{slf}$ of the own vehicle 100 and the travelling speed $V_{back}$ of the following vehicle 300, or the rear intervehicle distance, to calculates the compatibility index $C_{back}$. However, the present disclosure is not limited thereto. For example, the compatibility index calculation unit 26 may use the intervehicle time between the own vehicle 100 and the following vehicle 300 to calculates the compatibility index $C_{back}$. Further, for example, the compatibility index calculation unit 26 may use an amount of change in the rear intervehicle distance for a predetermined period, or a travelling speed difference between the travelling speed $V_{slf}$ of the own vehicle 100 and the travelling speed $V_{back}$ of the following vehicle 300 for predetermined period, to calculate the compatibility index $C_{back}$. In other words, generally, the compatibility index calculation unit 26 may utilize at least one of the rear intervehicle distance, the travelling speed difference between the travelling speed $V_{slf}$ of the own vehicle 100 and the travelling speed $V_{back}$ of the following vehicle 300, the intervehicle time between the own vehicle 100 and the following vehicle 300, an amount of change in the rear intervehicle distance for a predetermined period, and an amount of change in the travelling speed difference for a predetermined period, to calculates the compatibility index $C_{back}$. Even with this configuration, the same effects as the above-described respective embodiments can be obtained.

In the above-described embodiments, the own vehicle 100 is a hybrid vehicle, but may be configured of a gasoline-vehicle having the engine 81 only as a power source. Moreover, the own vehicle 100 may be an electric vehicle having the motor generator 83 only for the driving source. According to the above-described embodiments, the fuel supply station according to the above-described fifth embodiment may be a power supply station. Moreover, the own vehicle 100 may be a fuel cell vehicle provided with a fuel cell that generates electric power using hydrogen and air. According to this configuration, the fuel supply station of the fifth embodiment may be a hydrogen supply station. Even with this configuration, the same effects as the above-described respective embodiments can be obtained.

In the above-described embodiments, the control unit 21 utilizes the energy efficiency index $C_{ene}$, the tracking index $C_{drb}$, and the compatibility index $C_{back}$ to perform the coasting travel determination. However, the tracking index $C_{drb}$ may be omitted to perform the coasting travel determination. In other words, the control unit 21 may perform the coasting travel determination based on an amount of the energy efficiency index $C_{ene}$ and an amount of the compatibility index $C_{back}$. Even with this configuration, the same effects as the above-described respective embodiments can be obtained.

According to the above-described embodiments, respective units 21 to 30 included in CPU 20, 20a, 20b and 20c always perform processes such as calculation, but may perform necessary processes in response to a command of the control unit 21. According to this configuration, when the process determines that the preceding vehicle 200 does not decelerate (step S220: NO) in the energy efficiency calculation process shown in FIG. 3, when the process determines that the acquired deceleration probability is smaller than or equal to the predetermined threshold (step S220a: NO) in the energy efficiency calculation process shown in FIG. 15, and when the process determines that the acquired rear intervehicle distance is smaller than or equal to the predetermined distance (step S310:NO) in the compatibility index calculation process shown in FIG. 7, the control unit 21 does not execute the above-described steps S120 to S145 as shown in FIG. 2. In other words, the process terminates the travelling control process without executing the calculation process of the indexes and the coasting travel determination. Hence, a processing load required for the calculation of the indexes and the coasting travel determination can be reduced. Even with this configuration, the same effects as the above-described respective embodiments can be obtained.

In the above-described embodiments, the weighting unit 29 may set the weighting in accordance with an instruction of the passenger of the own vehicle 100. Specifically, the weighting unit 29 experimentally sets in advance respective weighting values $w_{ene}$, $w_{drb}$ and $w_{back}$. For example, the weighting value $w_{ene}$ of the energy efficiency index may be set to 0.4, the weighting value $w_{drb}$ of the tracking index may be set to 0.3, and the weighting value $w_{back}$ of the compatibility index may be set to 0.3. Then, the weighting unit 29 receives, via an input unit mounted on the own vehicle 100, a desired weighting value of the passenger of the own vehicle 100, and contents of an index value prioritized by the passenger, and these values and contents may be reflected to the respective weighting values $w_{ene}$, $w_{drb}$ and $w_{back}$. For example, as the input unit, a handle, a lever, a button, a pedal, and a speech input unit may be employed. Further, the weighting unit 29 may acquire weighting values from the traffic information or a road-side device and sets the acquired weight values. Even with this configuration, the same effects as the above-described respective embodiments can be obtained.

In the above-described embodiments, the tracking index calculation unit 25 uses average values $B_{acc}$ and $B_{cst}$ of the intervehicle time between the own vehicle 100 and the preceding vehicle 200 to calculate the tracking index $C_{drb}$. However, the present disclosure is not limited to this configuration. For example, the tracking index calculation unit 25 may use the maximum value of the intervehicle time between the own vehicle 100 and the preceding vehicle 200 in the preceding vehicle travelling speed pattern $V_{fore\text{-}ptn}$ to calculate the tracking index $C_{drb}$. Also, the tracking index calculation unit 25 may use the average value of the front intervehicle distance, the maximum value of the front intervehicle distance, the average value of the travelling speed difference between the preceding vehicle 200 and the own vehicle 100, and the integrated value of the travelling speed difference and the like, to calculate the tracking index $C_{drb}$. Even with this configuration, the same effects as the above-described respective embodiments can be obtained.

According to the above-described embodiments, a part or all of functions or processes accomplished by software may be accomplished by hardware. Also, a part or all of functions or processes accomplished by hardware may be accomplished by software. As the hardware, for example, various circuit such as an integrated circuit, a discrete circuit, or a circuit module in which those integrated circuit and the discrete circuit are combined, may be utilized. In the case where a part or all of functions according to the present disclosure is accomplished by software, the software (computer program) may be provided as a computer readable recording media where the program is stored therein. The computer readable recoding media is not limited to a portable recording media such as flexible disk or CD-ROM, but may be an internal memory unit such as various ROM or RAM included in the computer unit, or an external memory unit such as hard disk fixed to the computer unit. In other words, the computer readable recording media includes recording media capable of storing data packets permanently not temporarily.

The present disclosure is not limited to the above-described embodiments. However, the present disclosure is applicable to various modifications without departing the spirit thereof. For example, embodiments corresponding to technical features in the various aspect described in the summary section, and technical features described in the modifications sections can be appropriately replaced or combined to solve a part of or all of the above-described problems or to achieve a part of or all of the above-described effects. Moreover, when any of those technical features is not described in the present specification as essential features, the feature can be appropriately removed. The present disclosure has been described in the above.

For a conventional type ACC, for example, a technique has been proposed in which a deceleration operation is performed for the own vehicle when a braking operation of the preceding vehicle is detected during ACC travelling. On the other hand, another technique has been proposed in which an upper limit of the acceleration factor of the own vehicle is changed based on a presence of a following vehicle during the ACC operation, thereby improving a fuel efficiency of the own vehicle. However, conventional techniques are insufficient to perform an appropriate travelling control of the vehicle during ACC operation. The travelling control of the vehicle in the ACC operation is preferably performed considering various travelling situations of the preceding vehicle and the following vehicle without disturbing smooth travelling of both vehicles. Hence, a technique capable of improving the energy efficiency of the vehicle in the ACC operation is required.

In view of above-mentioned circumstances, according to the present disclosure, as a first aspect of an embodiment, a travelling control apparatus is provided. The travelling control apparatus controls a travelling of a vehicle and includes: a preceding vehicle information acquiring unit that acquires a preceding vehicle travelling speed pattern indicating a change in a travelling speed of a preceding vehicle travelling ahead of the vehicle, the traveling speed pattern being estimated using a travelling state of the preceding vehicle; an energy efficiency index calculation unit that acquires an own vehicle travelling speed pattern as a travelling pattern indicating a change in a travelling speed of the vehicle in the case where the vehicle travels tracking the preceding vehicle when the preceding vehicle is travelling based on the preceding vehicle travelling speed pattern, and calculates an energy efficiency index indicating a degree of improvement in an energy efficiency of the vehicle in the case where the vehicle travels based on the acquired own vehicle travelling speed pattern; a coexisting index calculation unit that calculates a coexisting index indicating a degree of coexisting between the vehicle and a following vehicle travelling behind the vehicle based on a travelling speed of the vehicle obtained by using a detection result of a sensor mounted on the vehicle and a travelling speed of the following vehicle; and a control unit that performs a coasting travel determination determining whether to execute a coasting travel of the vehicle based on a degree of the energy efficiency index calculated by the energy efficiency index calculation unit and a degree of the coexisting index calculated by the coexisting index calculation unit. According to the travelling control apparatus of the first aspect of the embodiment, since it is determined whether to execute the coasting travel of the vehicle based on the energy efficiency index indicating a degree of improvement in an energy efficiency of the vehicle and the coexisting index indicating a degree of coexisting between the vehicle and a following vehicle, as a vehicle travelling with a preceding vehicle and a following vehicle, the energy efficiency of the vehicle can be improved while suppressing a decrease of the coexisting with the following vehicle.

The present disclosure may be embodied in various ways other than the travelling control apparatus. For example, the present disclosure may be embodied with a vehicle provided with a travelling control apparatus, a travelling control method, a computer program executing the travelling control method, and a recording media storing the computer program.

What is claimed is:

1. A travelling control apparatus that controls travelling of a vehicle comprising:
a preceding vehicle information acquiring unit that acquires a preceding vehicle travelling speed pattern indicating a change in a travelling speed of a preceding vehicle travelling ahead of the vehicle, the traveling speed pattern being estimated using a travelling state of the preceding vehicle;
an energy efficiency index calculation unit that acquires an own vehicle travelling speed pattern as a travelling pattern indicating a change in a travelling speed of the vehicle in the case where the vehicle travels tracking the preceding vehicle when the preceding vehicle is travelling based on the preceding vehicle travelling speed pattern, and calculates an energy efficiency index, which is a reduction rate of a braking energy of the vehicle, indicating a degree of improvement in an energy efficiency of the vehicle in the case where the vehicle travels based on the acquired own vehicle travelling speed pattern;
a compatibility index calculation unit that calculates a compatibility index indicating a degree of compatibility between the vehicle and a following vehicle travelling behind the vehicle based on a travelling speed of the vehicle obtained by using a detection result of a sensor mounted on the vehicle and a travelling speed of the following vehicle; and
a control unit that performs a coasting travel determination determining whether to perform a coasting travel of the vehicle based on a degree of the energy efficiency index calculated by the energy efficiency index calculation unit and a degree of the compatibility index calculated by the compatibility index calculation unit,
wherein the energy efficiency index is determined by this equation:
the energy efficiency index $C_{ene}=A_{cst}/A_{acc}$, where $A_{acc}$ is a braking energy estimated to be required when the vehicle travels under adaptive cruise control based on the own vehicle travelling speed pattern and $A_{cst}$ is a braking energy estimated to be required when the vehicle travels under coasting control based on the own vehicle travelling speed pattern.

2. The travelling control apparatus according to claim 1, wherein
the travelling control apparatus further comprising a tracking index calculation unit that calculates, when the vehicle travels based on the own vehicle travelling speed pattern acquired by the energy efficiency index calculation unit, a tracking index indicating a degree of trackability of the vehicle relative to the preceding vehicle; and
the control unit performs the coasting travel determination based on a degree of the tracking index in addition to the energy efficiency index and the compatibility index.

3. The travelling control apparatus according to claim 1, wherein
the compatibility index calculation unit is configured to calculate the compatibility index utilizing at least one of:
a rear intervehicle distance between the vehicle and the following vehicle;
a travelling speed difference between the travelling speed of the vehicle and the travelling speed of the following vehicle;
an intervehicle time between the vehicle and the following vehicle;
an amount of change in the rear intervehicle distance for a predetermined period; and
an amount of change in the travelling speed difference for a predetermined period.

4. The travelling control apparatus according to claim 1, wherein
the vehicle is provided with a communication unit;
the travelling control apparatus further comprises:
a tracking index calculation unit that calculates, when the vehicle travels based on the own vehicle travelling speed pattern acquired by the energy efficiency index calculation unit, a tracking index indicating a degree of trackability of the vehicle relative to the preceding vehicle;
a following vehicle information acquiring unit that acquires a travelling state of the following vehicle via the communication unit; and
a weighting unit that sets a weighting value for each of the energy efficiency index, the tracking index, and the compatibility index,
the weighting unit is configured to set the weighting value for each of the energy efficiency index, the tracking index, and the compatibility index based on the travelling state of the following vehicle acquired by the following vehicle information acquiring unit;
the control unit is configured to perform the coasting travel determination based on the energy efficiency index, the tracking index, and the compatibility index in which weighting values are added.

5. The travelling control apparatus according to claim 4, wherein
the following vehicle information acquiring unit is configured to acquire a drive mode of the following vehicle as the travelling state; and
the weighting unit is configured to set the weighting value of the energy efficiency index, when the drive mode acquired by the following vehicle information acquiring unit is an economy mode, to be larger than the weighting value of the tracking index and the weighting value of the compatibility index, and set the weighting value of the tracking index and the weighting value of the compatibility index, when the drive mode acquired by the following vehicle information acquiring unit is the speed mode, to be larger than the weighting value of the energy efficiency index.

6. The travelling control apparatus according to claim 1, wherein
the travelling control apparatus further comprises a deceleration probability acquiring unit that acquires a deceleration probability of the preceding vehicle;
the control unit is configured not to perform the coasting travel determination when the deceleration probability acquired by the deceleration probability acquiring unit is less than or equal to a first threshold.

7. The travelling control apparatus according to claim 6, wherein
the first threshold is set such that the smaller a rear intervehicle distance between the vehicle and the following vehicle, the larger the first threshold is.

8. The travelling control apparatus according to claim 1, wherein
the travelling control apparatus further comprises:
a tracking index calculation unit that calculates, when the vehicle travels based on the own vehicle travelling speed pattern acquired by the energy efficiency index calculation unit, a tracking index indicating a degree of trackability of the vehicle relative to the preceding vehicle;
a weighting unit that sets a weighting value for each of the energy efficiency index, the tracking index, and the compatibility index; and
a cruising distance calculation unit that calculates a cruising distance of the vehicle,
the weighting unit is configured to set the weighting value of the energy efficiency index, when the cruising distance calculated by the cruising distance calculation unit is smaller than a second threshold set for a determination, to be larger than the weighting value of the tracking index and the weighting value of the compatibility index.

9. The travelling control apparatus according to claim 8, wherein
the weighting unit is configured to set the second threshold based on either a travelling distance from a current location of the vehicle to a destination or a travelling distance from the current location to a fuel supply station.

10. The travelling control apparatus according to claim 1, wherein
the preceding vehicle information acquiring unit is configured to further acquire a travelling environment of the preceding vehicle;
the travelling control apparatus further comprising:
a tracking index calculation unit that calculates, when the vehicle travels based on the own vehicle travelling speed pattern acquired by the energy efficiency index calculation unit, a tracking index indicating a degree of trackability of the vehicle relative to the preceding vehicle;
a weighting unit that sets a weighting value for each of the energy efficiency index, the tracking index, and the compatibility index; and
a αestimation unit that estimates a cause of deceleration of the preceding vehicle by using the travelling environment of the preceding vehicle acquired by the preceding vehicle information acquiring unit,
the weighting unit is configured to set the weighting value of the energy efficiency index, when the deceleration cause estimated by the deceleration cause estimation unit is a predetermined cause set in advance, to be larger than the weighting value of the tracking index and the weighting value of the compatibility index.

11. The travelling control apparatus according to claim 10, wherein
the predetermined cause is at least one of:
a traffic signal that indicates red, located at a predetermined distance away from a current location of the preceding vehicle in a travelling direction thereof;
a cross-walk located at the predetermined distance away from the preceding vehicle in the travelling direction thereof;
a road sign indicating a temporary stop, located at the predetermined distance away from the preceding vehicle in the travelling direction thereof; and
a toll gate located at the predetermined distance away from the preceding vehicle in the travelling direction thereof.

12. The travelling control apparatus according to claim 1, wherein
the control unit is configured not to perform the coasting travel determination when a rear intervehicle distance between the vehicle and the following vehicle is smaller than a predetermined intervehicle distance.

* * * * *